US009320013B2

(12) United States Patent
Singh et al.

(10) Patent No.: US 9,320,013 B2
(45) Date of Patent: Apr. 19, 2016

(54) METHODS AND APPARATUSES FOR IMPROVED PAGING AREA IDENTIFIER SELECTION IN WIRELESS NETWORKS CONTAINING LOW POWER BASE STATIONS

(71) Applicant: QUALCOMM Incorporated, San Diego, CA (US)

(72) Inventors: Damanjit Singh, San Diego, CA (US); Peerapol Tinnakornsrisuphap, San Diego, CA (US); Mehmet Yavuz, San Diego, CA (US); Yeliz Tokgoz, San Diego, CA (US)

(73) Assignee: QUALCOMM Incorporation, San Diego, CA (US)

( * ) Notice: Subject to any disclaimer, the term of this patent is extended or adjusted under 35 U.S.C. 154(b) by 21 days.

(21) Appl. No.: 13/691,608

(22) Filed: Nov. 30, 2012

(65) Prior Publication Data
US 2013/0143562 A1 Jun. 6, 2013

Related U.S. Application Data

(60) Provisional application No. 61/566,501, filed on Dec. 2, 2011, provisional application No. 61/603,207, filed on Feb. 24, 2012.

(51) Int. Cl.
H04W 68/00 (2009.01)
H04W 36/00 (2009.01)
(Continued)

(52) U.S. Cl.
CPC .............. H04W 68/02 (2013.01); H04W 24/02 (2013.01); H04W 68/04 (2013.01); H04W 60/00 (2013.01); H04W 68/00 (2013.01); H04W 84/045 (2013.01)

(58) Field of Classification Search
CPC ... H04W 68/02; H04W 24/02; H04W 84/045; H04W 68/00; H04W 68/04; H04W 60/00; H04W 4/00; H04W 24/00; H04W 36/00; H04W 84/02; H04W 84/10; H04W 84/105; H04W 68/025; H04W 36/04; H04W 88/00; H04W 88/02; H04W 88/08; H04W 4/06; H04W 48/00; H04W 48/08; H04W 48/10; H04B 7/00; H04B 17/00; H04M 3/00; H04M 1/00

USPC .................. 455/41.2, 67.11, 67.13, 418–420, 455/422.1, 423–425, 426.1, 432.1–43.3, 455/433–434, 436–445, 456.1–456.6, 457, 455/500–509, 512–515, 522, 550.1, 552.1, 455/556.2, 561, 562.1; 370/328, 332–334, 370/338–339, 342
See application file for complete search history.

(56) References Cited

U.S. PATENT DOCUMENTS 6,058,308 A * 5/2000 Kallin et al. ............... 455/432.3
6,185,421 B1 2/2001 Alperovich et al.
(Continued)

FOREIGN PATENT DOCUMENTS

EP 1130936 A1 9/2001
EP 1318688 A2 6/2003
(Continued)

OTHER PUBLICATIONS

International Search Report and Written Opinion—PCT/US2012/067653—ISA/EPO—Mar. 6, 2013.
(Continued)

Primary Examiner — Meless Zewdu

(57) ABSTRACT

The present disclosure presents methods and apparatuses for improved paging area identifier selection in femto nodes and other low power base stations. In some examples described in the present disclosure, a method is provided for selecting a paging area identifier at a low power base station, which includes determining whether a neighboring high power base station is detectable. Additionally, the method can include observing, where the neighboring high power base station is detectable, a broadcasted paging area identifier of the neighboring high power base station. Furthermore, example methods may include selecting a paging area identifier of the low power base station to be the broadcasted paging area identifier and transmitting the paging area identifier.

39 Claims, 15 Drawing Sheets

(51) Int. Cl.
*H04W 24/00* (2009.01)
*H04W 68/02* (2009.01)
*H04W 24/02* (2009.01)
*H04W 68/04* (2009.01)
*H04W 60/00* (2009.01)
*H04W 84/04* (2009.01)

(56) References Cited

U.S. PATENT DOCUMENTS

| | | | |
|---|---|---|---|
| 6,549,775 B2* | 4/2003 | Ushiki et al. | 455/432.1 |
| 6,650,900 B1 | 11/2003 | Chavez, Jr. et al. | |
| 7,142,879 B2* | 11/2006 | Watanabe et al. | 455/458 |
| 7,937,096 B2 | 5/2011 | Funato et al. | |
| 8,204,517 B1 | 6/2012 | Rai et al. | |
| 8,219,121 B2* | 7/2012 | Sim et al. | 455/458 |
| 8,374,624 B2 | 2/2013 | Baik et al. | |
| 8,374,625 B2 | 2/2013 | Wang et al. | |
| 8,626,163 B2* | 1/2014 | Maeda et al. | 455/435.1 |
| 2006/0155860 A1* | 7/2006 | Funato et al. | 709/228 |
| 2007/0232321 A1 | 10/2007 | Casati et al. | |
| 2008/0102826 A1 | 5/2008 | Voyer et al. | |
| 2008/0119209 A1* | 5/2008 | Upp | 455/458 |
| 2009/0017845 A1 | 1/2009 | Wu et al. | |
| 2009/0086672 A1 | 4/2009 | Gholmieh et al. | |
| 2009/0098890 A1 | 4/2009 | Vasudevan et al. | |
| 2009/0181672 A1* | 7/2009 | Horn et al. | 455/435.1 |
| 2009/0280823 A1 | 11/2009 | Petrovic et al. | |
| 2009/0316649 A1 | 12/2009 | Chen | |
| 2010/0004001 A1 | 1/2010 | Tao et al. | |
| 2010/0029283 A1 | 2/2010 | Iwamura | |
| 2010/0081454 A1* | 4/2010 | Wang et al. | 455/456.1 |
| 2010/0113070 A1 | 5/2010 | Nigam et al. | |
| 2010/0120426 A1 | 5/2010 | Singh et al. | |
| 2010/0120448 A1 | 5/2010 | Iwamura et al. | |
| 2010/0136984 A1 | 6/2010 | Brisebois | |
| 2010/0151813 A1* | 6/2010 | Faerber et al. | 455/404.1 |
| 2010/0159929 A1* | 6/2010 | Homchaudhuri | 455/436 |
| 2010/0159960 A1* | 6/2010 | Chou et al. | 455/458 |
| 2010/0171979 A1 | 7/2010 | Yuan | |
| 2010/0173630 A1 | 7/2010 | Han et al. | |
| 2010/0184421 A1 | 7/2010 | Lindqvist et al. | |
| 2010/0226311 A1 | 9/2010 | Yang et al. | |
| 2010/0242103 A1 | 9/2010 | Richardson et al. | |
| 2010/0255860 A1* | 10/2010 | Ji | 455/458 |
| 2010/0273512 A1* | 10/2010 | Wang et al. | 455/458 |
| 2010/0317386 A1 | 12/2010 | Da Silva et al. | |
| 2010/0323610 A1* | 12/2010 | Li et al. | 455/3.01 |
| 2011/0053616 A1* | 3/2011 | Lee et al. | 455/458 |
| 2011/0058542 A1* | 3/2011 | Nylander et al. | 370/338 |
| 2011/0122859 A1* | 5/2011 | Song et al. | 370/338 |
| 2011/0143802 A1 | 6/2011 | Shin et al. | |
| 2011/0171979 A1 | 7/2011 | Rune | |
| 2011/0237251 A1 | 9/2011 | Chow et al. | |
| 2011/0244869 A1* | 10/2011 | Olofsson et al. | 455/442 |
| 2011/0261777 A1 | 10/2011 | Maeda et al. | |
| 2012/0088496 A1 | 4/2012 | Lee et al. | |
| 2012/0178490 A1 | 7/2012 | Jain et al. | |
| 2013/0143563 A1 | 6/2013 | Singh et al. | |

FOREIGN PATENT DOCUMENTS

| | | |
|---|---|---|
| EP | 2079258 A1 | 7/2009 |
| EP | 2109326 A1 | 10/2009 |
| EP | 2214434 A1 | 8/2010 |
| JP | 2001275145 A | 10/2001 |
| JP | 2003174665 A | 6/2003 |
| JP | 2006279782 A | 10/2006 |
| JP | 2008193365 A | 8/2008 |
| JP | 2009076974 A | 4/2009 |
| WO | 2010117172 A2 | 10/2010 |
| WO | 2010126249 A2 | 11/2010 |
| WO | 2011023234 A1 | 3/2011 |

OTHER PUBLICATIONS

Taiwan Search Report—TW101145348—TIPO—Oct. 21, 2014.

* cited by examiner

METHODS AND APPARATUSES FOR IMPROVED PAGING AREA IDENTIFIER SELECTION IN WIRELESS NETWORKS CONTAINING LOW POWER BASE STATIONS

CLAIM OF PRIORITY UNDER 35 U.S.C. §119

The present application for patent claims priority to two provisional applications: Provisional Application No. 61/566,501, filed Dec. 2, 2011; and Provisional Application No. 61/603,207, filed Feb. 24, 2012. Both of these provisional applications are entitled "Method and Apparatus for Paging Area Code Assignment in Femtocell Networks," both are assigned to the assignee hereof and both are hereby expressly incorporated by reference herein. This application is also related to application Ser. No. 13/691,618, filed on the same day, entitled "Methods and Apparatuses for Improved Paging Area Identifier Selection in Wireless Networks Containing Low Power Base Stations," which is expressly incorporated by reference herein in its entirety and for all purposes.

BACKGROUND

1. Field

The disclosed aspects relate generally to communications between and/or within devices and specifically to methods and systems for improving paging and other signaling in wireless environments that include low power base stations.

2. Background

Advances in wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, etc.). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications, such as those published by the Third Generation Partnership Project (3GPP), 3GPP long term evolution (LTE), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

To supplement conventional base stations, additional low power base stations can be deployed to provide more robust wireless coverage to mobile devices. For example, low power base stations (e.g., which can be commonly referred to as Home NodeBs or Home eNBs, collectively referred to as H(e)NBs, femtocell nodes, pico nodes, micro nodes, etc.) can be deployed for incremental capacity growth, richer user experience, in-building or other specific geographic coverage, and/or the like. In some configurations, such low power base stations are connected to the Internet via broadband connection (e.g., digital subscriber line (DSL) router, cable or other modem, etc.), which can provide the backhaul link to the mobile operator's network. In this regard, low power base stations are often deployed in homes, offices, etc. without consideration of a current network environment.

In addition, such low power base stations can employ one or more area identifiers, such as a location area code, tracking area code, routing area code, color code etc., which can be used in transmitting paging signals for one or more devices. The devices can utilize the area identifier to determine whether paging signals related to the devices can be received from the low power base stations. If not, for example, the devices can register in the area defined by the area identifier to receive paging signals related to the devices, and the low power base stations can accordingly page the devices where device-related communications (e.g., a voice call) are received from the mobile network. Where neighboring low power base stations have varying area identifiers, for example, this can cause frequent signaling from one or more devices to constantly register in the new area when reselecting among low power base stations and/or high power base stations.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

SUMMARY

Figure 1:
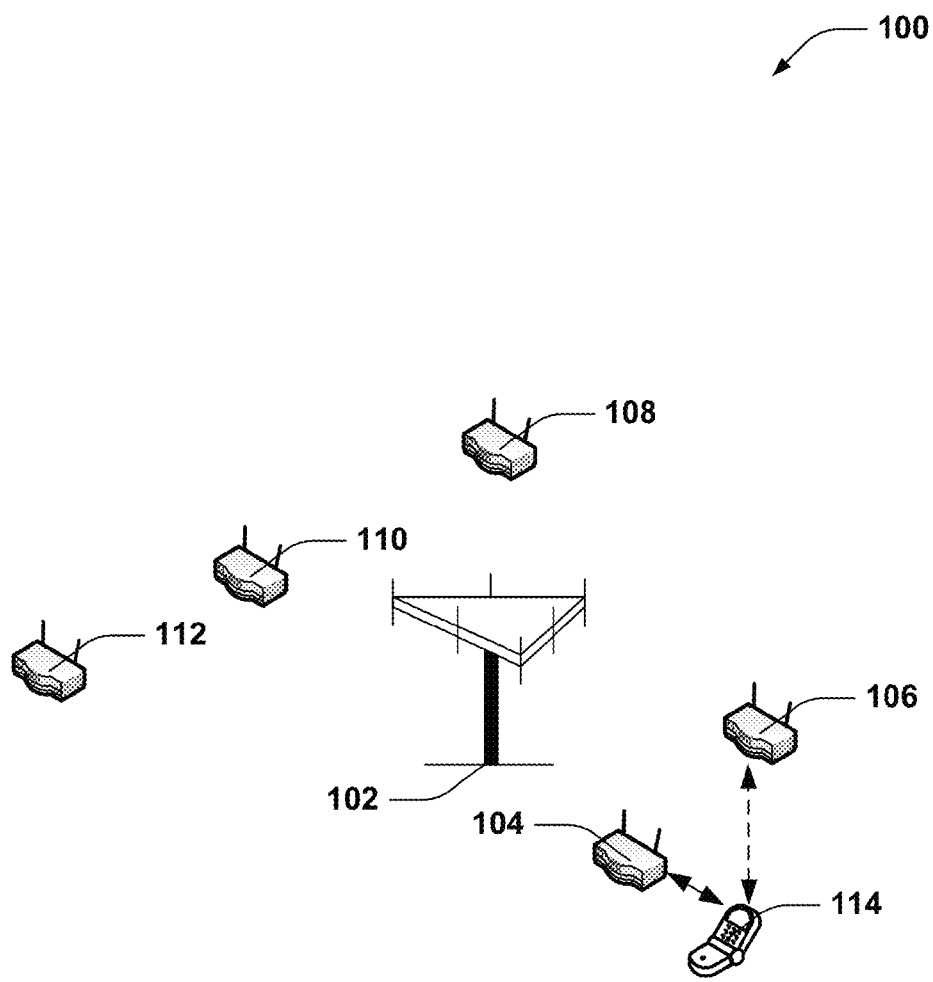
FIG. 1 is a block diagram of an example system that facilitates selecting a paging area identifier of a low power base station.

The following presents a summary of one or more aspects to provide a basic understanding of such aspects. This summary is not an extensive overview of all contemplated aspects, and is not intended to identify key or critical elements of all aspects nor delineate the scope of any or all aspects. Its purpose is to present some concepts of one or more aspects form as a prelude to the more detailed description presented later.

In accordance with one or more aspects and corresponding disclosure thereof, various aspects are described in connection with improving paging and other signaling in wireless environments that include low power base stations. For example, in some examples according to the present disclosure, a method is provided for selecting a paging area identifier at a low power base station, which includes determining whether a neighboring high power base station is detectable and observing, where the neighboring high power base station is detectable, a broadcasted paging area identifier of the neighboring high power base station. Furthermore, example methods may include selecting a paging area identifier of the low power base station to be the broadcasted paging area identifier and transmitting the paging area identifier.

In another exemplary aspect, the present application presents an apparatus for selecting a paging area identifier, which can include at least one processor configured to perform several functions. For example, the processor may determine whether a neighboring high power base station is detectable and can observe, where the neighboring high power base station is detectable, a broadcasted paging area identifier of the neighboring high power base station. In addition, the at least one processor of the apparatus may select a paging area identifier to be the broadcasted paging area identifier and may also be configured to transmit the paging area identifier.

Yet another aspect presented herein describes an apparatus for selecting a paging area identifier, the apparatus including means for determining whether a neighboring high power base station is detectable and means for observing, where the neighboring high power base station is detectable, a broadcasted paging area identifier of the neighboring high power base station. Additionally, the apparatus may include means for selecting a paging area identifier to be the broadcasted paging area identifier and means for transmitting the paging area identifier.

Additionally, the present application presents an example computer-readable medium that may store executable code for determining whether a neighboring high power base station is detectable. Such code may also include code for observing, where the neighboring high power base station is detectable, a broadcasted paging area identifier of the neighboring high power base station and code for selecting a paging area identifier to be the broadcasted paging area identifier. In addition, the code by include code for transmitting the paging area identifier.

To the accomplishment of the foregoing and related ends, the one or more aspects comprise features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As described further herein, low power base stations can select an associated paging area identifier based on one or more observed parameters of one or more other base stations. In this example, at least some low power base stations in a similar area can select the same paging area identifier, which allows devices communicating with the lower power base stations to receive paging signals from the low power base stations in the area. Thus, the devices are not required to reregister upon reselecting to a low power base station with the same paging area identifier. In one example, low power base stations can select a paging area identifier based on one or more parameters related to a neighboring high power base station and/or a neighboring low power base station. In either case, low power base stations within an area can observe similar parameters regarding base stations, and can thus select the same paging area identifier. The paging area identifier can include, but is not limited to, one or more of a location area code (LAC), tracking area code (TAC), routing area code (RAC), color code, and/or substantially any identifier related to a paging message. Though one of these specific terms may be used below, it is to be appreciated that concepts can similarly apply to the other types of paging area identifiers.

In an example, however, a low power base station can update a selected paging area identifier in various scenarios. For example, the low power base station can detect a threshold number of reselections and corresponding registrations originating from one or more other low power base stations over a period of time, which can indicate that using the different paging area identifier of the one or more other low power base stations may decrease the number of registrations. In another example, the low power base station can determine that a paging load is over a threshold for a given paging area identifier, and the low power base station can thus select a new paging area identifier to decrease the paging load on the network. The low power base station, in either case, can attempt to select a paging area identifier of another nearby base station to maintain the benefits of coordinated paging area identifier assignment discussed above. Additionally, thresholds for determining to select a different paging area identifier can be lower for low power base stations at a border of a coverage area. In addition, aspects are described for decreasing the paging load by paging devices from a last known low power base station, and then expanding the paging starting with base stations using the same paging area identifier, etc.

A low power base station, as referenced herein, can include a low power base station, a pico node, micro node, home Node B or home evolved Node B (H(e)NB), relay, and/or other low power base stations, and can be referred to herein using one of these terms, though use of these terms is intended to generally encompass low power base stations. For example, a low power base station transmits at a relatively low power as compared to a high power base station associated with a wireless wide area network (WWAN). As such, the coverage area of the low power base station can be substantially smaller than the coverage area of a high power base station.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal or device may be a cellular telephone, a satellite phone, a cordless telephone, a Session Initiation Protocol (SIP) phone, a wireless local loop (WLL) station, a personal digital assistant (PDA), a handheld device having wireless connection capability, a tablet, a computing device, or other processing devices connected to a wireless modem. Moreover, various aspects are described herein in connection with a base station. A base station may be utilized for communicating with wireless terminal(s) and may also be referred to as an access point, a Node B, evolved Node B (eNB), home Node B (HNB) or home evolved Node B (HeNB), collectively referred to as H(e)NB, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA, WiFi carrier sense multiple access (CSMA), and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, an example wireless communication system 100 is illustrated that facilitates configuring a paging area identifier for one or more low power base stations. System 100 includes a high power base station 102 that can provide one or more devices with access to a wireless network, as well as a plurality of low power base stations 104, 106, 108, 110, and 112, which can also provide wireless network access over a backhaul link with a mobile network over a broadband internet connection. For purposes of the present disclosure, a high power base station may include one or more of a macro network base station, a macrocell base station, a wide area network base station, cellular base station, cell tower, cell site, or any other radio network device that can provide radio coverage to an area typically larger than that of a low power base station. In an aspect, such a high power base station coverage area may have a range on the order of hundreds of meters to tens of kilometers, though these example distances are not limiting and vary greatly depending on terrain, civilian structures, signal frequency, antenna altitude, among other factors not explicitly listed here. In one example, low power base stations 104, 106, 108, 110, and/or 112 can be one or more of a relay node, a device (e.g., communicating in peer-to-peer or ad-hoc mode with other devices), etc. Moreover, system 100 comprises a mobile device 114 that communicates with one or more of the low power base stations 104 and/or 106 to receive wireless access to the mobile network. For purposes of the present disclosure, a low power base station may include, but is not limited to, one or more of a Home NodeB or Home eNB, collectively referred to as H(e)NBs, femtocell node, pico node, micro node, and, generally, any wireless access point generally having a smaller coverage area than that of a high power base station. Such a low power base station coverage area may be on the order of one to ten meters or tens of meters, though this example coverage area is not limiting.

In this example, at least low power base stations 104, 106, 108, and 110 can be positioned within one or more cells provided by high power base station 102. In used in describing some nonlimiting examples herein, the term "neighboring," when used in conjunction with a subject device, area, or other entity, may refer to a different device, area, or other entity having coverage area that at least partially overlaps with the coverage area of the subject device, area, or other entity. For example, in a non-limiting aspect of FIG. 1, a coverage area of low power base station 104 may at least partially overlap with a coverage area of high power base station 102 or a cell thereof. In such a non-limiting example aspect, high power base station 102 may be a neighboring high power base station.

In accordance with additional aspects described herein, low power base station 104, for example, can select a paging area identifier for broadcasting based in part on one or more parameters observed from a high power base station 102 or a cell thereof. For example, low power base station 104 can select the high power base station 102 or a related cell as a point of reference for determining the paging area identifier. In this example, other high power base stations can be observed by low power base station 104, and low power base station 104 can select high power base station 102 as the point of reference due to one or more radio frequency (RF) parameters, such as operating frequency, received signal power (e.g., received signal code power (RSCP)), etc., one or more operator policies, and/or the like. In one example, low power base station 104 can prefer high power base station 102 on one of multiple operating frequencies thereof based on an operator policy.

Once low power base station 104 selects the high power base station 102 as the point of reference, low power base station 104 can determine a LAC or other paging area identifier based in part on a paging area identifier advertised by high power base station 102. In addition, the low power base station 104 can update a determined paging area identifier based on one or more parameters. In one example, low power base station 104 can base the paging area identifier selection on a mapping between possible paging area identifiers advertised by the high power base station 102 and a paging area identifier for selection by the low power base station 104 (e.g., a one-to-one mapping, a mapping to ranges of possible paging area identifiers of the high power base station 102, etc.). For example, low power base station 104 can receive the RF parameters using a network listening module (NLM) to obtain signals transmitted by the high power base station 102.

In addition, low power base stations 106, 108, and 110 can similarly select high power base station 102 as the point of reference, and can also select a paging area identifier based on the paging area identifier of high power base station 102, which can result in low power base stations 104, 106, 108, and 110 that are in a similar area using the same paging area identifier. In this example, as a result of the described aspects, device 114 communicating with low power base station 104 can reselect to low power base station 106 without requiring additional registration to receive paging signals from low power base station 106 since low power base station 106 is associated with the same paging area identifier.

In another example, low power base station 104 can select the paging area identifier based additionally or alternatively on one or more other observed parameters of the high power base station 102, such as cell identity, primary scrambling code (PSC), RAC, TAC, etc. For example, high power base station 102 can provide multiple cells within which one or more devices can communicate with high power base station 102 and the multiple cells of high power base station 102 can broadcast the same paging area identifier. In one example, low power base stations 104 and 106 can be within coverage of one cell, while low power base stations 108 and 110 are within the coverage of another cell of base station 102. In this example, where low power base station 106 communicates in different cell of high power base station 102 than low power base station 108, low power base station 106 may select a different paging area identifier than low power base station 108 based on an identity of the cell of high power base station 102. This in effect provides more granular paging areas at the expense of possibly added signaling of a device, such as device 114, which may need to register after reselecting from low power base station 106 in one cell to low power base station 108 in another cell of the same high power base station 102.

In another example, a low power base station, such as low power base station 112 can be out-of-range of a high power base station 102. In this example, low power base station 112 can select a paging area identifier based on one or more parameters observed of a neighboring low power base station, such as low power base station 110. For example, low power base station 112 can determine a paging area identifier of low power base station 110 based on one or more signals transmitted by the low power base station 110 (e.g., as received by a NLM of low power base station 112), and can set the paging area identifier of low power base station 112 to be the same at least where low power base stations 110 and 112 are not associated with a closed subscriber group (CSG) or associated with the same CSG.

In another example, low power base station 104, for example, can select a paging area identifier based on one or more parameters observed of one or more other low power base stations, such as low power base station 106 (e.g., in addition or alternatively to parameters observed of high power base station 102). For example, the parameters can include a paging area identifier of low power base station 106, RF parameters related to low power base station 106 (e.g., received signal power), operator policies (e.g., observing a low power base station on the same frequency as low power base station 104 can be preferred), number of low power base stations observed using a given paging area identifier, reselection parameters broadcasted by one or more low power base stations, a CSG identifier, and/or the like.

Additionally, low power base station 104 can update a paging area identifier based on one or more determinations regarding the network environment. For example, where low power base station 104 receives a threshold number of reselections and/or registrations of devices coming from low power base station 106, or another low power base station, this can indicate that the low power base station 104 may be better suited to use another paging area identifier. In some cases, low power base station 104 can update its paging area identifier based on a number of reselections and/or registrations received in a given time period in an attempt to lessen the number of reselections/registrations. In another example, low power base station 104 can update its paging area identifier based on determining that paging load in the network is over a threshold level. In either case, low power base station 104 can attempt to use a paging area identifier that is also used by a nearby low power base station or high power base station, as described.

Figure 2:
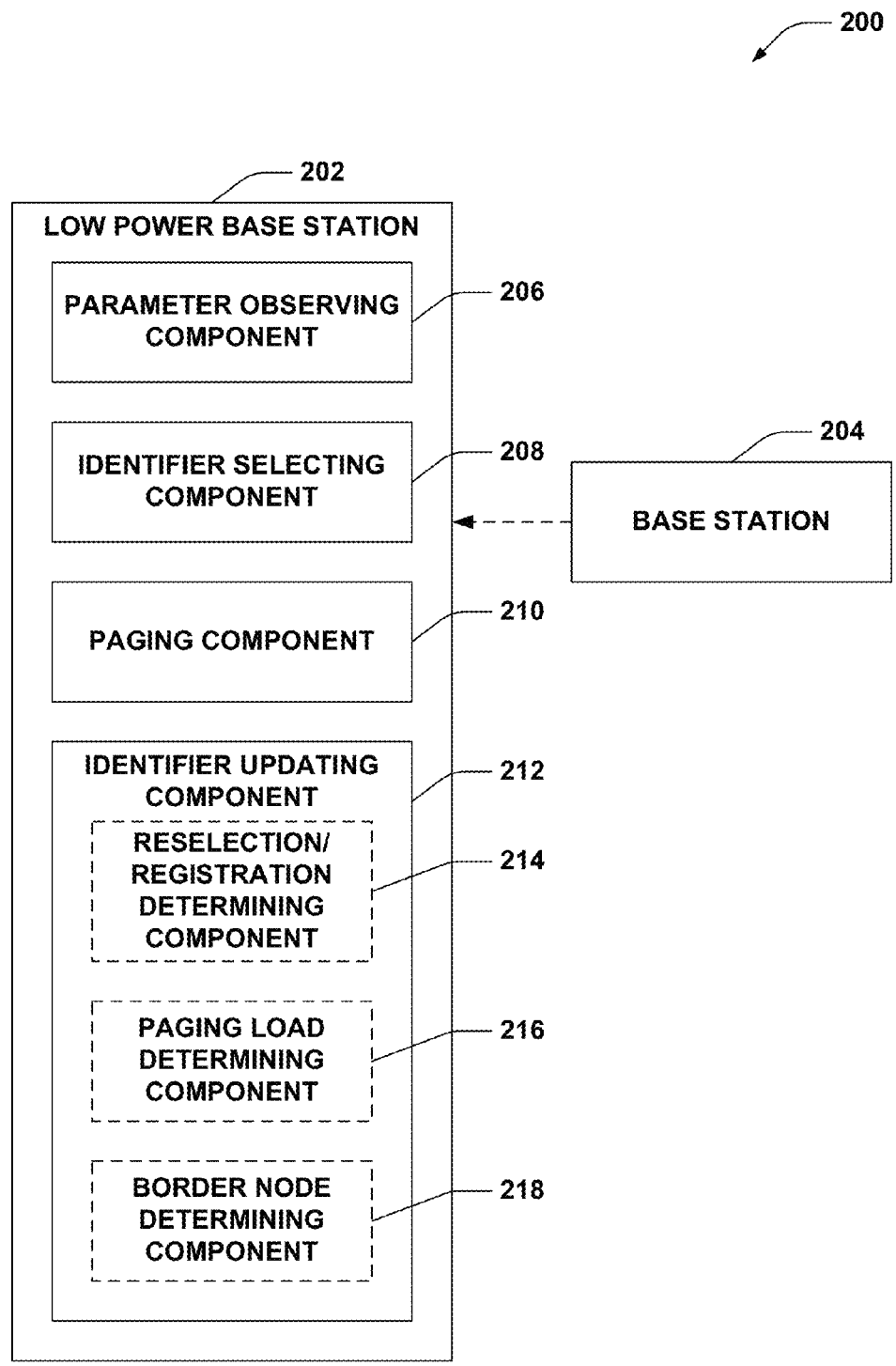
FIG. 2 is a block diagram of an example system that facilitates selecting a paging area identifier based on one or more observed parameters.

FIG. 2 illustrates an example system 200 for selecting a paging area identifier for a low power base station. System 200 includes a low power base station 202 that can observe parameters communicated by one or more base stations, such as base station 204. Low power base station 202 can be substantially any low power base station, mobile device, etc., and can, in one example, include one or more of low power base stations 104, 106, 108, 110, and/or 112 (FIG. 1), as described herein. Base station 204, for example, can be a high power base station, low power base station or other low power base station, a relay, a mobile base station, a device (e.g., communicating in peer-to-peer or ad-hoc mode with one or more devices, etc.).

Low power base station 202 can include a parameter observing component 206 for obtaining one or more parameters transmitted by one or more base stations, an identifier selecting component 208 for setting a paging area identifier based in part on the one or more parameters, and a paging component 210 for transmitting paging signals to one or more devices in a paging area specified by the paging area identifier. Low power base station 202 also includes an identifier updating component 212 for selecting another identifier based on modified parameters of the one or more base stations, or other triggers or events. Identifier updating component 212 can include a reselection/registration determining component 214 for detecting frequent reselection/registration, a paging load determining component 216 for observing a paging load in a network, and/or a border node determining component 218 for determining whether low power base station 202 operates at a border for a given paging area identifier.

According to an example, base station 204 can be a high power base station that transmits one or more signals in a wireless network, and may be a neighbor high power base station as observed by low power base station 202. Parameter observing component 206, for example, can determine whether any other base station is detectable to low power base station 202. In other words, parameter observing component 206 may be configured to initially scan one or more channels to determine whether low power base station 202 is able to detect a pilot signal, beacon signal, advertisement signal, or any other signal transmitted by any other base station (e.g. base station 204, a high power base station, another low power base station, or the like). Additionally and/or alternatively, a receiver and/or processor (both not shown) of low power base station 202, which may be internal or external to parameter observing component 206, may be configured to perform this scanning for other base stations or cells.

In addition, parameter observing component 206 may be configured to obtain one or more parameters from the one or more signals transmitted by base station 204 for determining a paging area identifier for the low power base station 202. In one example, base station 204 can broadcast a signal specifying a LAC of base station 204. For example, parameter observing component 206 can determine the LAC of the base station 204 from the signal, and identifier selecting component 208 can determine a LAC or other paging area identifier (e.g., TAC, RAC, etc.) for low power base station 202 based in part on the determined LAC of base station 204.

In one example, the identifier selecting component 208 can utilize a mapping or other function, e.g. stored in a memory, of possible base station 204 LACs to one or more LACs to be used by low power base station 202. For example, identifier selecting component 208 can receive the mapping as part of a configuration from a network or a local configuration, from a hardcoding, and/or the like. Moreover, for example, identifier selecting component 208 can utilize the mapping or other function to determine the LAC based on a cell identifier broadcasted by base station 204. In another example, identifier selecting component 208 can compute the paging area identifier based on the LAC of base station 204 and an associated public land mobile network (PLMN) identifier thereof (e.g., using a function based on the LAC and PLMN identifier).

In an example, as described, parameter observing component 206 can select base station 204 as a point of reference for determining the one or more related parameters based on RF parameters of the base station 204 (e.g., as compared to other base stations), such as an operating frequency, received signal power, etc., operator policy, which can be preconfigured on the low power base station 202 and can include a preference for an operating frequency, and/or the like. For example, parameter observing component 206 can select base station 204 over other base stations as having a highest received signal power over a given frequency.

In another example, parameter observing component 206 can additionally or alternatively obtain other parameters of base station 204, which identifier selecting component 208 can utilize to determine the paging area identifier for low power base station 202. For example, parameter observing component 206 can determine a cell identity related to a cell of the base station 204 within which the low power base station 202 is situated, and identifier selecting component 208 can select the paging area identifier based at least in part on the cell identity. In other examples, parameter observing component 206 can obtain a PSC of base station 204, a RAC or TAC of base station 204, etc., and identifier selecting component 208 can select a paging area identifier based additionally or alternatively in part on the PSC, RAC, TAC, etc.

In another example, base station 204 can be another low power base station. Thus, in one example, parameter observing component 206 can differentiate high power base stations from low power base stations based on one or more observed parameters, such as a PSC range determined for the base station 204 (e.g., a range below a threshold indicates a low power base station), CSG/PSC split information observed in broadcast messages from the base station 204 (e.g., certain CSGs or PSCs can correspond to low power base stations), a presence or absence of a CSG in a broadcast message from base station 204 (e.g., a CSG can indicate low power base station, and open low power base stations can be deployed as hybrid with a common CSG for open access in order to facilitate identification as a low power base station), a transmit power level indicated in system information broadcasted by base station 204 (e.g., a transmit power level below a threshold indicates a low power base station), and/or the like.

In the case of a low power base station, parameter observing component 206 can obtain one or more parameters from the low power base station 204. For example, parameter observing component 206 can select the low power base station 204 where a high power base station cannot be located, or can otherwise select the low power base station (e.g., based on a policy to prefer low power base stations, more desirable RF parameters at the low power base station, and/or the like). In any case, for example, parameter observing component 206 can obtain a LAC or other paging area identifier of the low power base station 204, and identifier selecting component 208 can select the same paging area identifier. In another example, parameter observing component 206 can additionally acquire a CSG identifier of base station 204, and identifier selecting component 208 can compare the CSG identifier of base station 204 to that of low power base station 202. In an aspect, for example where the CSG identifiers match, identifier selecting component can select the same paging area identifier as advertised by base station 204. Where the CSG identifiers are different, for example, identifier selecting component 208 can select a different paging area identifier than that used by base station 204.

In yet another example, where base station 204 is a low power base station, parameter observing component 206 can determine RF parameters of the low power base station 204 and identifier selecting component 208 can determine to select the same paging area identifier as the low power base station 204. In another example, parameter observing component 206 can determine an operator policy related to selecting paging area identifiers of other low power base stations, such as selecting from a low power base station that operates on the same frequency. Thus, in an aspect, where low power base station 204 operates on the same frequency as low power base station 202, as determined by parameter observing component 206, identifier selecting component 208 can select the paging identifier of low power base station 204. Furthermore, in an example, parameter observing component 206 can determine a number of neighboring low power base stations using a given paging area identifier, and identifier selecting component 208 can select the paging area identifier for low power base station 202 based on the number of neighboring low power base stations (e.g., paging identifiers used by more low power base stations can be preferred). Moreover, in other examples, parameter observing component 206 can determine reselection parameters one or more neighboring low power base stations, such as low power base station 204, and can determine which low power base station has a highest probability of being reselected (e.g., which low power base station receives a highest number of reselections). Identifier selecting component 208 can determine the paging area identifier of the low power base station with the highest probability of reselection as the paging area identifier of low power base station 202.

In another example, where base station 204 is not present, identifier selecting component 208 can randomly, or at least pseudo-randomly (e.g., based on an identifier of low power base station 202) select a paging area identifier for low power base station 202. In this example, if parameter observing component 206 discovers a new neighboring low power base station, identifier updating component 212 can change the paging area identifier to that of the new neighboring low power base station. In one example, the neighboring low power base station can be discovered by parameter observing component 206 detecting signals therefrom, from a device reselecting to low power base station 202 that indicates the paging area identifier of the previous low power base station, and/or the like.

In yet another example, parameter observing component 206 can provide observed parameters to a centralized entity, such as a HNB management server (HMS) or other network component, which can include the logic of identifier selecting component 208 to select a paging area identifier for the low power base station 202 based on the received parameters, and can return the paging area identifier to low power base station 202.

Furthermore, in an example, identifier updating component 212 can update the paging area identifier of low power base station 202 based in part on one or more determinations. For example, reselection/registration determining component 214 can determine that reselections from a certain neighboring base station, such as base station 204, exceed a threshold for a given period of time (e.g., based on reselection/registration determining component 214 receiving reselection signals from related base station 204 and registration requests from related devices). In one example, reselection/registration determining component 214 can compute a ratio of reselections to registrations from base station 204 in a given time period. If the ratio is over a threshold, identifier updating component 212 can update the paging area identifier to match that of base station 204. Thus, devices handed over from base station 204 no longer need to register at low power base station 202.

In one example, reselection/registration determining component 214 can obtain radio resource control (RRC) connection request messages from devices handing over to low power base station 202, which can include an establishment clause value indicating registration and an initial device identity. The device identity, in one example, can include a temporary mobile subscriber identity (TMSI) and a location area identifier (LAI)/routing area identifier (RAI), from which a LAC/RAC of base station 204 can be determined Reselection/registration determining component 214 can thus evaluate frequency of registrations with similar LAC/RAC over a period of time, and can change the LAC/RAC to that of base station 204 where the frequency is over a threshold. In addition, identifier updating component 212 can notify neighboring low power base stations of the change in paging area identifier, and/or the low power base stations can determine the change based on broadcast signals received from low power base station 202. This could create a race condition where base station 202 and base station 204 change identifiers at the same time; in this case, communication between low power base station 202 and base station 204 (e.g., or otherwise through a centralized entity) can occur to determine which node updates its identifier.

In another example, where paging load determining component 216 determines a paging load at low power base station 202 is over a threshold, identifier updating component 212 can switch paging area identifiers to reduce the paging load. In this example, paging load determining component 216 can count paging messages received in a network over a period of time. Also, for example, paging load determining component 216 can differentiate packet switched (PS) and circuit switched (CS) paging signals by checking for a paging area identifier to determine if LAC or RAC is overloaded. If there is no paging area identifier, the paging signal can be considered for both LAC and RAC, or a network domain indicator can be used to identify LAC or RAC.

If paging load determining component 216 determines LAC or RAC to be overloaded, identifier updating component 212 can update the LAC or RAC. This can include identifier updating component 212 determining whether neighboring low power base stations use a different LAC/RAC, and if so, identifier updating component 212 can use the different LAC/RAC. Where there are multiple possible LACs/RACs, identifier updating component 212 can choose a LAC/RAC corresponding to a low power base station with a higher RSCP. Moreover, for example, where identifier updating component 212 updates the paging area identifier due to detected paging overload, it can be forbidden from updating the paging area identifier again for a period of time to avoid a ping-ponging effect between different paging area identifiers.

In one example, identifier updating component 212 can give priority to updating the identifier based on output from paging load determining component 216 over reselection/registration determining component 214. Moreover, in either case, if there are no neighboring low power base stations or all paging area identifiers have been tried, identifier updating component 212 can select a paging area identifier at random.

In another example, border node determining component 218 can determine a proximity of low power base station 202 to a border between two paging areas. For example, border node determining component 218 can determine a frequency of receiving multiple paging area identifiers from nearby low power base stations in a given time period. This can include receiving signals related to the low power base stations that specify the paging area identifiers (e.g., based on a reselection or registration request from a related device, based on a paging signal received by an parameter observing component 206, etc.). Based on the proximity determined by border node determining component 218, identifier updating component 212 can set thresholds for reselections/registrations and/or for paging load, used respectively by reselection/registration determining component 214 and paging load determining component 216. For example, where low power base station 202 is within close proximity to the border as determined by border node determining component 218, identifier updating component 212 can set lower thresholds than if low power base station 202 is determined to be in further proximity of the boarder. Where low power base station 202 is on the border, it thus switches paging area identifiers faster based on the lowered thresholds.

In yet another example, parameter observing component 206 can determine that low power base station 204 changes a paging area identifier (e.g., based on receiving signals therefrom and processing the signals to determine the paging area identifier according to a timer or other event), and identifier updating component 212 can accordingly change the paging area identifier of low power base station 202 to match that of low power base station 204.

Figure 3:
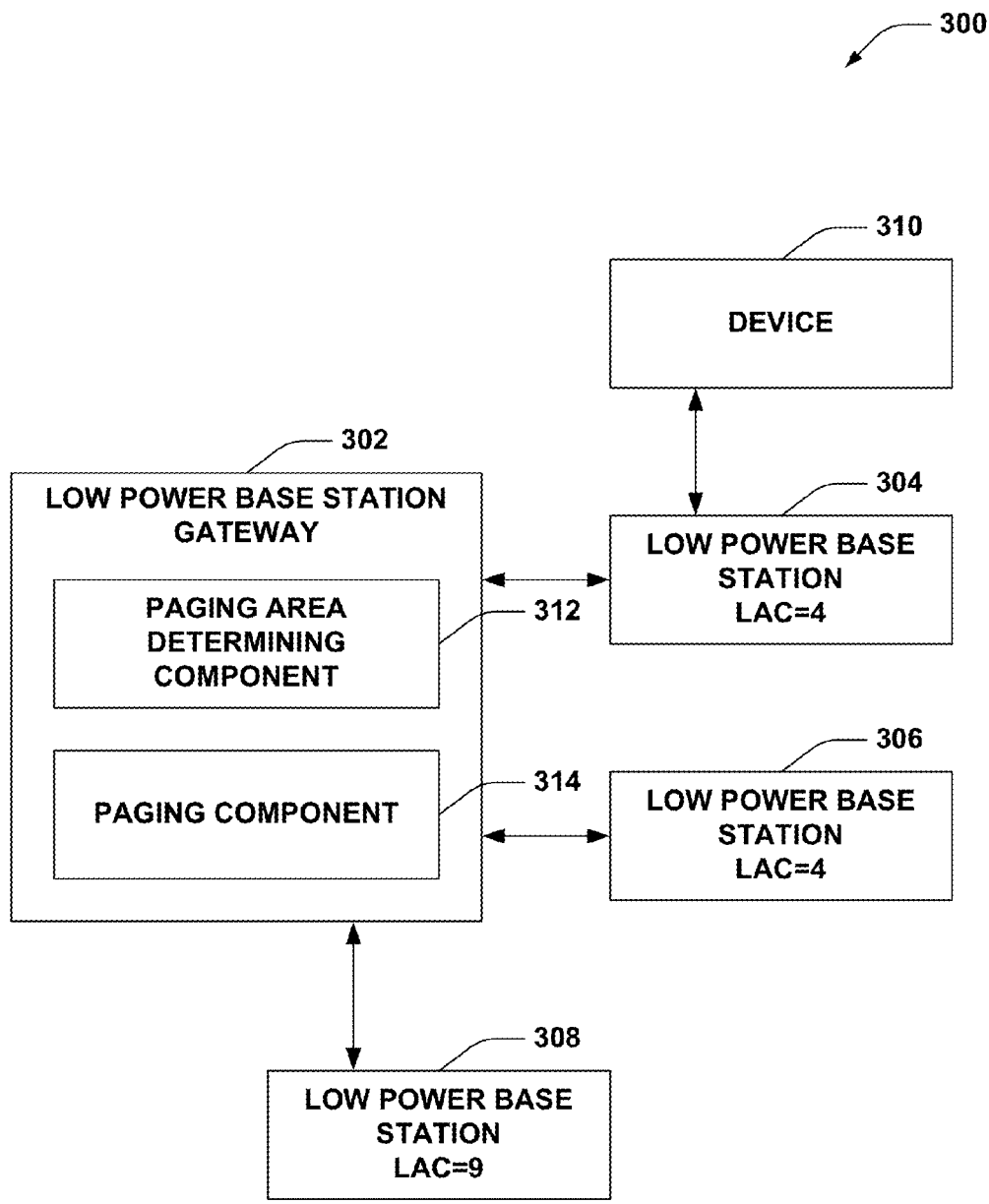
FIG. 3 is a block diagram of an example system that facilitates paging devices in a wireless network.

FIG. 3 illustrates an example system 300 for determining low power base stations for paging a device to decrease paging load in a network. System 300 includes a low power base station gateway 302 for managing aspects of one or more low power base stations 304, 306, and 308. For example, the low power base station gateway 302 can be a core network gateway that can coordinate resource assignment, interference management, identifier assignment, or other aspects of low power base stations 304, 306, and 308. For example, low power base station gateway 302 can be similar to a H(e)NB gateway. System 300 also comprises a device 310 that communicates with one or more of low power base stations 304, 306, and 308 to receive wireless network access.

Low power base station gateway 302 can include a paging area determining component 312 for defining a paging area for paging a device, and a paging component 314 for causing low power base stations in the defined paging area to transmit a paging signal for the device.

According to an example, low power base stations 304 and 306 can select, or otherwise be assigned, LAC=4, and low power base station 308 can select LAC=9, as described. Low power base station gateway 302 can receive a page for a device 310 communicating with one or more of the low power base stations 304, 306, or 308 corresponding to low power base station gateway 302. In this example, paging area determining component 312 can define a paging area for sending a paging signal to the device 310. In one example, paging area determining component 312 can determine to cause a last known low power base station for device 310 to page the device 310. In one example, this can be low power base station 304, and paging component 314 can accordingly cause low power base station 304 to transmit the paging signal for device 310. If no response is received, this can indicate that device 310 did not receive the paging signal for some reason (e.g., it moved or powered down, or signal conditions have otherwise degraded).

In this example, paging area determining component 312 can expand the paging area to all low power base stations with the same paging area identifier as the last known low power base station for device 310. In this example, the paging area determining component 312 determines the paging area to include low power base station 304 and low power base station 306 having the same LAC. Paging component 314 can cause both low power base station 304 and 306 to transmit the paging signal for device 310. In one example, paging area determining component 312 can determine to exclude the last known low power base station, low power base station 304, from this subsequent page since device 310 did not respond to the first page. If no response is received to the second page, paging area determining component 312 can continue expanding the area (e.g., determining a nearby LAC of a low power base station near one or more low power base stations having the LAC of the last known low power base station, and/or including all low power base stations with the nearby LAC in the paging area, etc.).

Referring to FIGS. 4-7, example methodologies relating to selecting a paging area identifier are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

Figure 4:
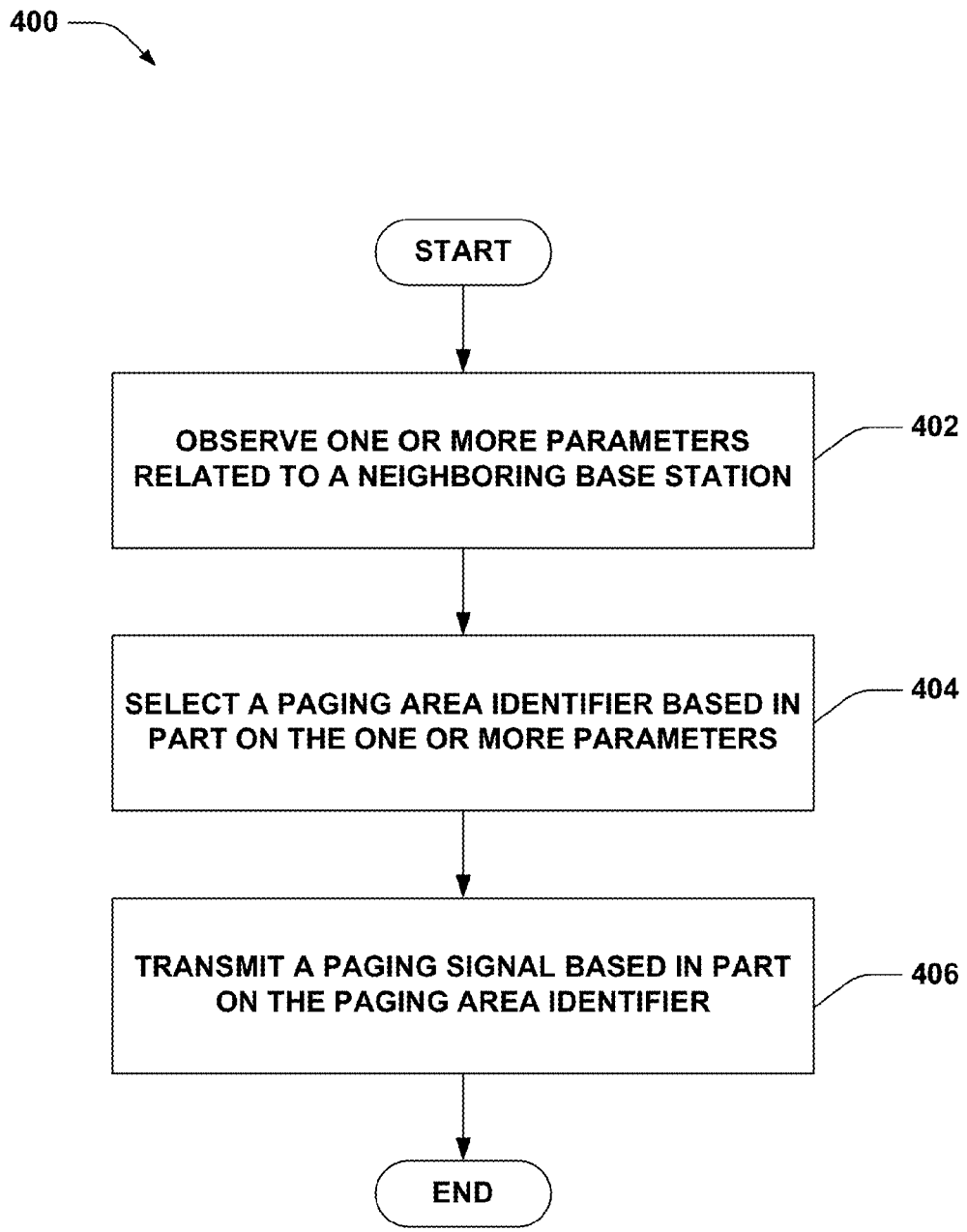
FIG. 4 is a flow chart of an aspect of an example methodology for selecting a paging area identifier.

Turning to FIG. 4, an example methodology 400 is displayed that facilitates selecting a paging area identifier. In an aspect, for example, methodology 400 may be defined in instructions stored on a low power base station, such as low power base station 202, or one or more components thereof, and executed by a processor to perform the described acts. Furthermore, although the following discussion of the aspects of FIG. 4 are described as being performed by a low power base station, it is understood that these aspects may be performed by any network entity, portable or tethered electronic device, user equipment, or any device that may communicate in a wireless environment.

At 402, a low power base station may determine whether a neighboring base station is detectable. For example, the low power base station may scan one or more available frequencies for a pilot signal, beacon, broadcast signal, advertisement message, or the like, transmitted by one or more other neighboring base stations. In an aspect, the neighboring base station can correspond to a high power base station, one or more low power base stations or femto nodes, etc.

Furthermore, the low power base station may observe one or more parameters of a neighboring high power base station, which may include observing a broadcasted paging area identifier at 404. In an optional aspect, the low power base station may obtain one or more coverage area parameters of the neighbor high power base station at 406. For example, the coverage area parameters can include, but are not limited to, a paging area identifier of the neighboring high power base station (e.g., received in a broadcast message and/or the like), a cell identifier, a PSC, a CSG identifier, reselection parameters, a number of base stations using a given paging area identifier, and/or the like.

In another optional aspect, the UE may determine whether to select a paging area code based on the one or more coverage area parameters. For example, in some examples, neighbor high power base station may serve several sectors or cells that may all share a particular paging area identifier. In some instances, a low power base station may wish to select a paging area identifier with more geographical precision than the shared paging area identifier. Thus, at 414, the low power base station may select a paging area identifier such that the low power base station coverage area is less than the neighboring high power base station coverage area. For example, the low power base station may select the paging area identifier based on the one or more coverage area parameters obtained at 406.

Turning to 410, where the low power base station does not perform optional aspects 406 and/or 408 or determines at 408 not to select the paging area identifier based on the coverage area parameters received at 406, the low power base station may select the paging area identifier to be the broadcasted paging area identifier observed at 404. Upon selecting the paging area identifier, the low power base station may transmit the paging area identifier to one or more devices at 412.

Returning to 402, according to some examples contemplated by the present disclosure, a low power base station may determine that a neighboring high power base station is not detectable. This may occur, for example, after the low power base station scans one or more frequencies for a pilot, beacon, or the like, but it does not detect a neighboring high power base station. In some examples, where it is determined that a neighboring high power base station is not detectable at 402, the low power base station may further determine whether a low power base station is detectable at 416. Again, the low power base station may make such a determination by scanning one or more frequencies for pilot signals, beacon signals, advertisements, or the like, and determining whether one or more of these aforementioned signals are present and associated with a low power base station. Where the low power base station determines at 416 that a neighbor low power base station is detectable, the low power base station may obtain a broadcasted paging area identifier of the neighbor low power base station 418. In addition, at 420, the low power base station may select its PAI to be the broadcasted paging area indicator of the neighbor low power base station and transmit the paging area indicator to one or more devices at 412.

In addition, returning to 416, in some instances, the low power base station may determine that no neighbor low power base stations are detectable. Where such a determination is made, the low power base station may obtain a random paging area identifier at 422. For example, in some instances, the low power base station may generate a random paging area indicator at an internal random paging area indicator generator. In other non-limiting examples, the random paging area indicator may be chosen at random from a list of previously used paging area indicators stored at the device. Furthermore, at 424, the low power base station may select a paging area indicator to be the random paging area indicator generated at 422. Once selected, the low power base station may additionally transmit the paging area indicator to one or more other devices at 412. This can include advertising the paging area identifier in the paging message, transmitting the paging message when a message is received from a core network comprising the paging area identifier, and/or the like.

Figure 5:
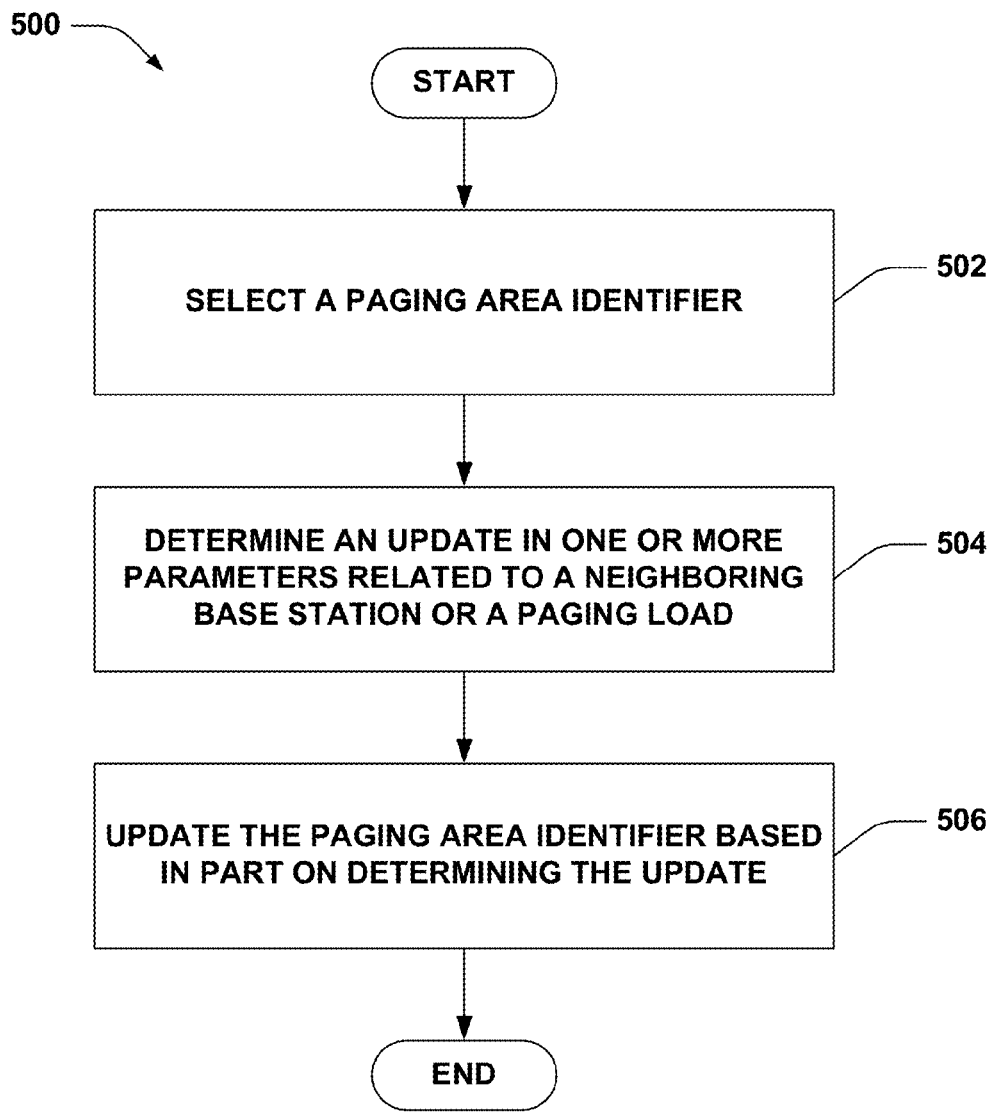
FIG. 5 is a flow chart of an aspect of an example methodology for updating a paging area identifier.

Referring to FIG. 5, an example methodology 500 for updating a paging area identifier is illustrated. In an aspect, for example, methodology 500 may be defined in instructions stored on a low power base station, such as low power base station 202, or one or more components thereof, and executed by a processor to perform the described acts.

At 502, a paging area identifier can be selected. This can include one or more of the steps described above, such as selecting the paging area identifier based on one or more observed parameters of a neighboring base station.

At 504, an update in one or more parameters related to a neighboring base station or a paging load can be determined. For example, the neighboring base station can change a paging area identifier, as described above. Moreover, the update in the one or more parameters can relate to determining reselection parameters, such as an increase in a number of reselections related to the neighboring base station.

At 506, the paging area identifier can be updated based in part on determining the update in the one or more parameters. For example, where a paging area identifier of the neighboring base station is updated, the paging area identifier at 506 can be updated to match that of the neighboring base station.

Figure 6:
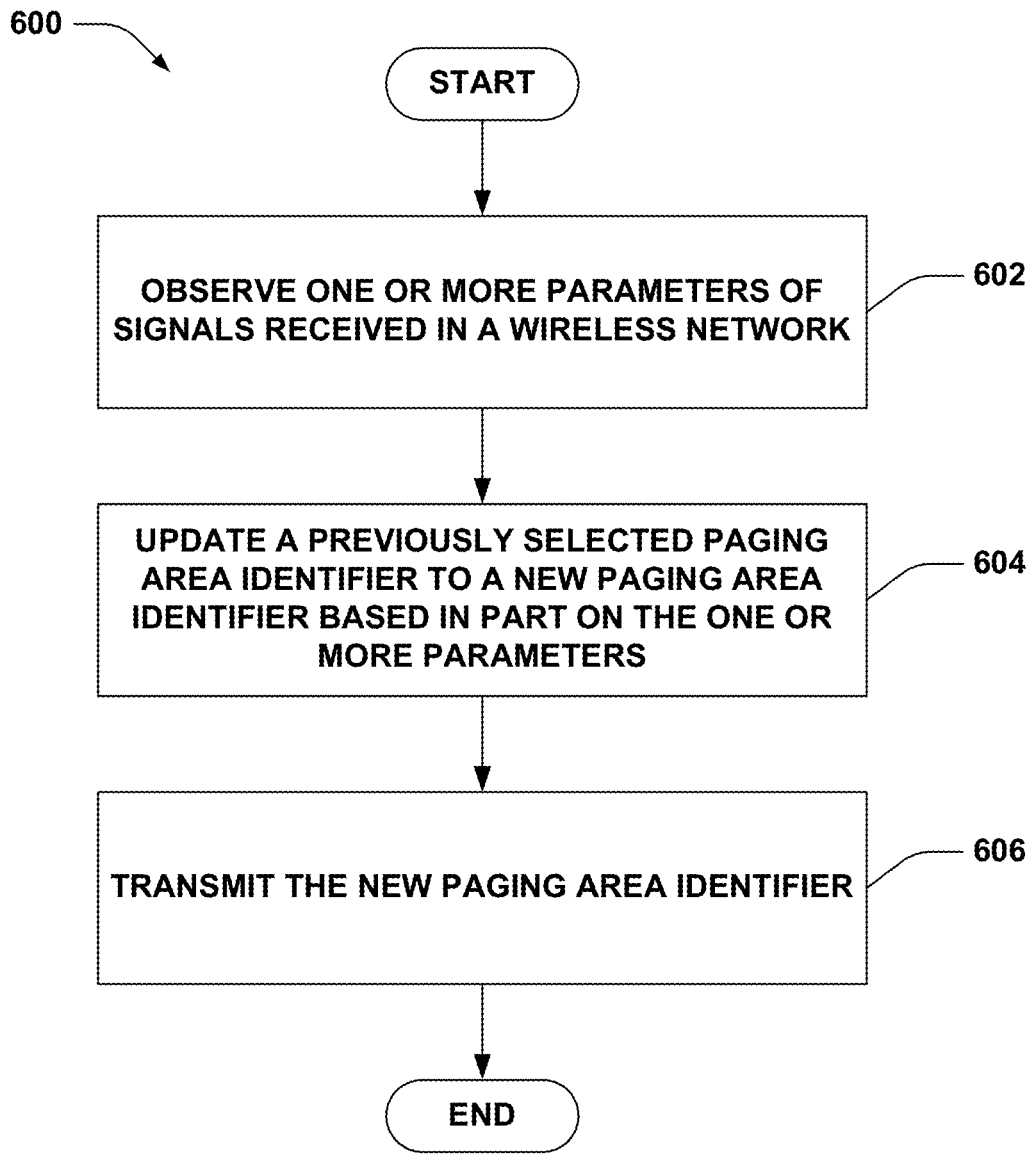
FIG. 6 is a flow chart of an aspect of an example methodology for updating a paging area identifier.

Referring to FIG. 6, depicted is an example methodology 600 for updating a paging area identifier based on one or more determinations. In an aspect, for example, methodology 600 may be defined in instructions stored on a low power base station, such as low power base station 202, or one or more components thereof, and executed by a processor to perform the described acts.

At 602, one or more parameters of signals received in a wireless network can be observed. For example, this can include determining a reselection/registration comparison or count over a period of time as related to devices coming from a neighboring low power base station, a paging signal count over a period of time, and/or the like as described.

At 604, a previously selected paging area identifier can be updated to a new paging area identifier based in part on the one or more parameters. As described, this can include updating to the paging area identifier of the neighboring low power base station where the reselections/registrations, or a comparison thereof, achieves a threshold. In another example, this can include updating to the paging area identifier of a neighboring low power base station where the paging load achieves a threshold to lessen the paging load for the previous paging area identifier, etc.

At 606, the new paging area identifier can be transmitted. This can include advertising the paging area identifier in the paging message, transmitting the paging message when a message is received from a core network comprising the paging area identifier, and/or the like.

Figure 7:
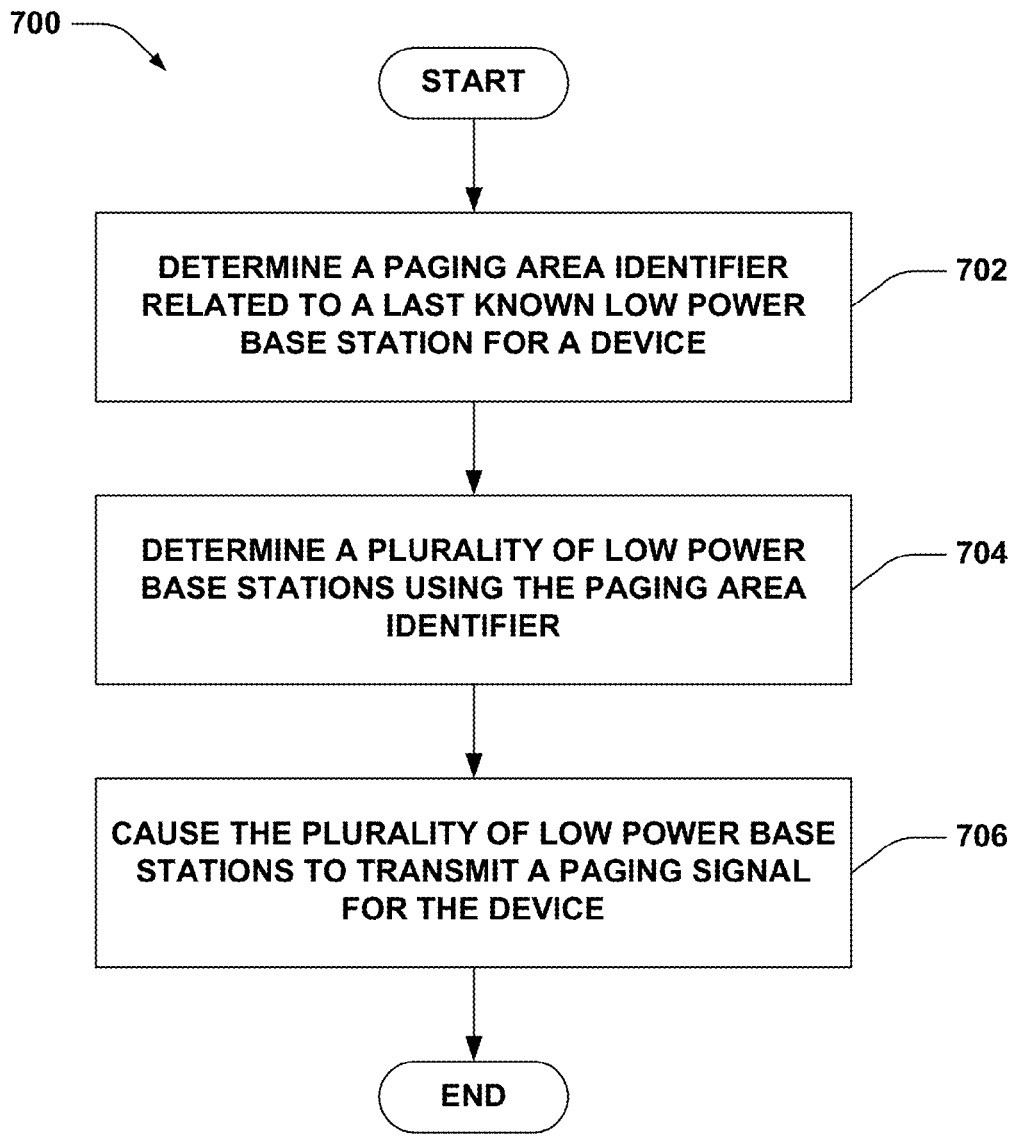
FIG. 7 is a flow chart of an aspect of an example methodology for paging devices in a wireless network.

Turning to FIG. 7, an example methodology 700 is shown for paging a device in a wireless network. In an aspect, for example, methodology 700 may be defined in instructions stored on a low power base station gateway, such as low power base station gateway 302, or one or more components thereof, and executed by a processor to perform the described acts.

At 702, a paging area identifier related to a last known low power base station for a device can be determined. For example, the device can register with the low power base station, and when a page is received for the device, the low power base station can transmit a paging signal to the device. Sometimes the device does not respond, as it may have moved, powered down, or otherwise is experiencing degraded signal quality with the last known low power base station.

At 704, a plurality of low power base stations using the same paging area identifier as the last known low power base station can be determined. For example, the low power base stations can register the paging area identifiers, and thus the low power base stations with the similar identifier can be determined based on the registration.

At 706, the plurality of low power base station can be caused to transmit a paging signal to the device. Thus, if the device is in the paging area, it can respond through a low power base station that may not be the last known low power base station. This can occur after initially attempting to page the device using the last known low power base station to decrease paging load at the network.

It will be appreciated that, in accordance with one or more aspects described herein, inferences can be made regarding selecting a paging area identifier, updating a paging identifier, determining one or more parameters related to a neighboring base station, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 8:
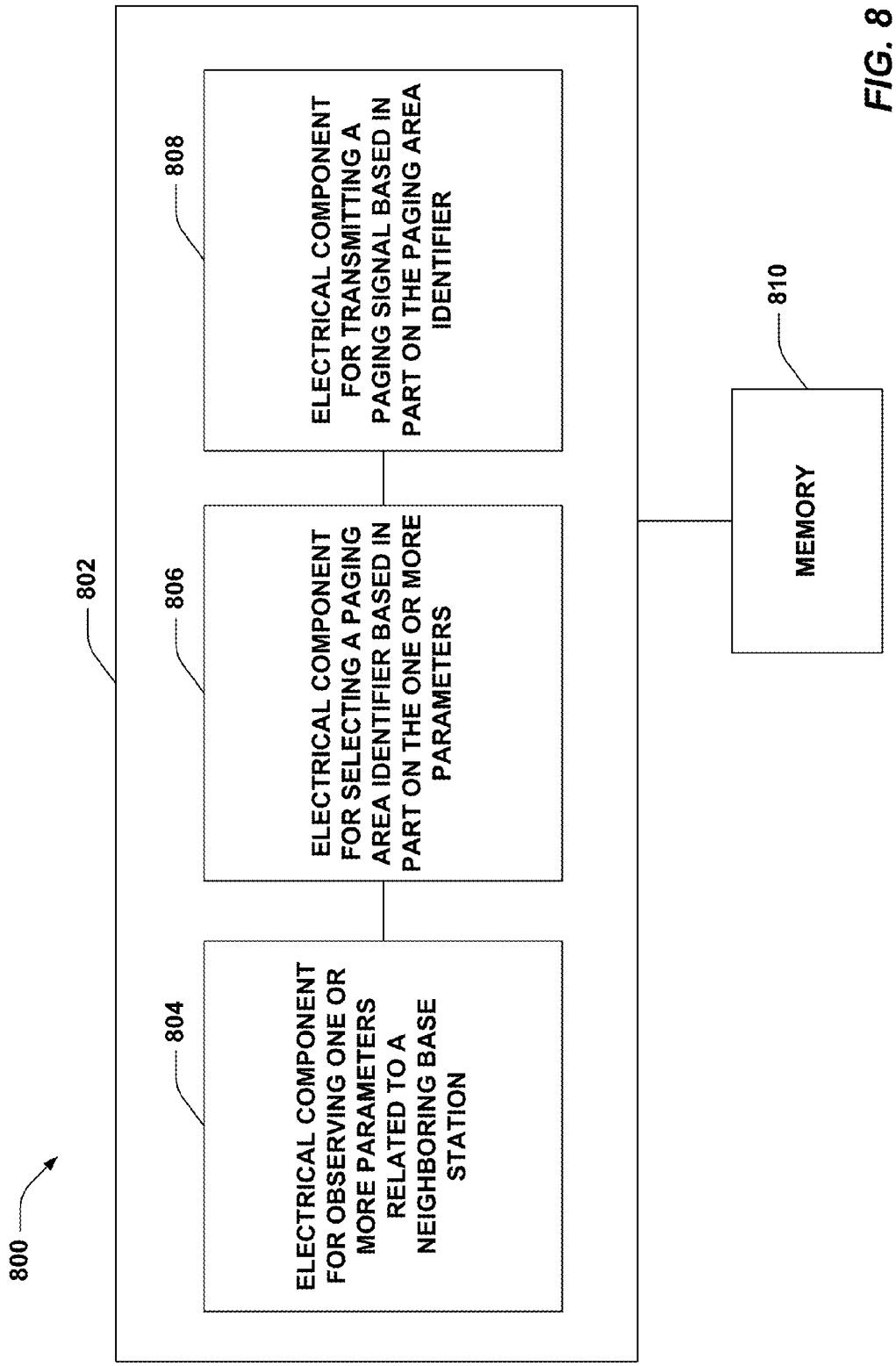
FIG. 8 is a block diagram of an example system that selects a paging area identifier.

With reference to FIG. 8, illustrated is a system 800 for selecting a paging area identifier. For example, system 800 can reside at least partially within a low power base station. It is to be appreciated that system 800 is represented as including functional blocks, which can be functional blocks that represent functions implemented by a processor, software, or combination thereof (e.g., firmware). System 800 includes a logical grouping 802 of electrical components that can act in conjunction. For instance, logical grouping 802 can include an electrical component for determining whether a base station is detectable 804. In an aspect, electrical component 804 may be a receiver, antenna, transceiver, or the like, and may be coupled with logic capable of scanning one or more frequencies for one or more pilot signals, beacons, or the like. Further, logical grouping 802 can comprise an electrical component for observing a paging area identifier 806. In some examples, electrical component 806 may be parameter observing component 206. Additionally, logical grouping 802 can comprise an optional electrical component 808 for obtaining one or more coverage area parameters 808. As described, the one or more parameters can correspond to a paging area identifier, cell identity, PSC, CSG identifier, and/or the like of the neighboring base station, which may be a high power base station. Additionally, logical grouping 802 can comprise an optional electrical component 810 for determining whether to select a paging area indicator based on one or more coverage area parameters. In addition, logical grouping 802 can comprise an optional electrical component 812 for selecting a paging area identifier such that a low power base station coverage area is less than a neighboring high power base station coverage area 812. In an aspect, electrical component 812 may select such a paging area indicator based on one or more coverage area parameters obtained by electrical component 808. Further, logical grouping 802 can comprise an electrical component 814 for selecting a paging area identifier. In addition, for example, electrical component 814, in an aspect, can include an identifier selecting component 208, as described above. As described, in an example, the paging area identifier can be selected to match that observed of the neighboring high power base station or a neighboring low power base station, based on a mapping to that of the one or more parameters of the corresponding neighboring base station, etc.

Moreover, logical grouping 802 can comprise an electrical component 816 for obtaining a random paging area indicator. As stated above, electrical component 816 may generate a random paging area indicator from those previously used by system 800 or from a set of all or part of the paging area indicators available to system 800 or a device therein. Further, logical grouping 802 can include an electrical component 818 for transmitting a paging signal based in part on the paging area identifier. Moreover, electrical component 808 can include a paging component 210, for example.

Additionally, system 800 can include a memory 820 that retains instructions for executing functions associated with the electrical components 804, 806, 808, 810, 812, 814, 816, and 818. While shown as being external to memory 820, it is to be understood that one or more of the electrical components 804, 806, 808, 810, 812, 814, 816, and 818 can exist within memory 820. In one example, electrical components 804, 806, 808, 810, 812, 814, 816, and 818 can comprise at least one processor, or each electrical component 804, 806, 808, 810, 812, 814, 816, and 818 can be a corresponding module of at least one processor. Moreover, in an additional or alternative example, electrical components 804, 806, 808, 810, 812, 814, 816, and 818 can be a computer program product comprising a computer readable medium, where each electrical component 804, 806, 808, 810, 812, 814, 816, and 818 can be corresponding code.

Figure 9:
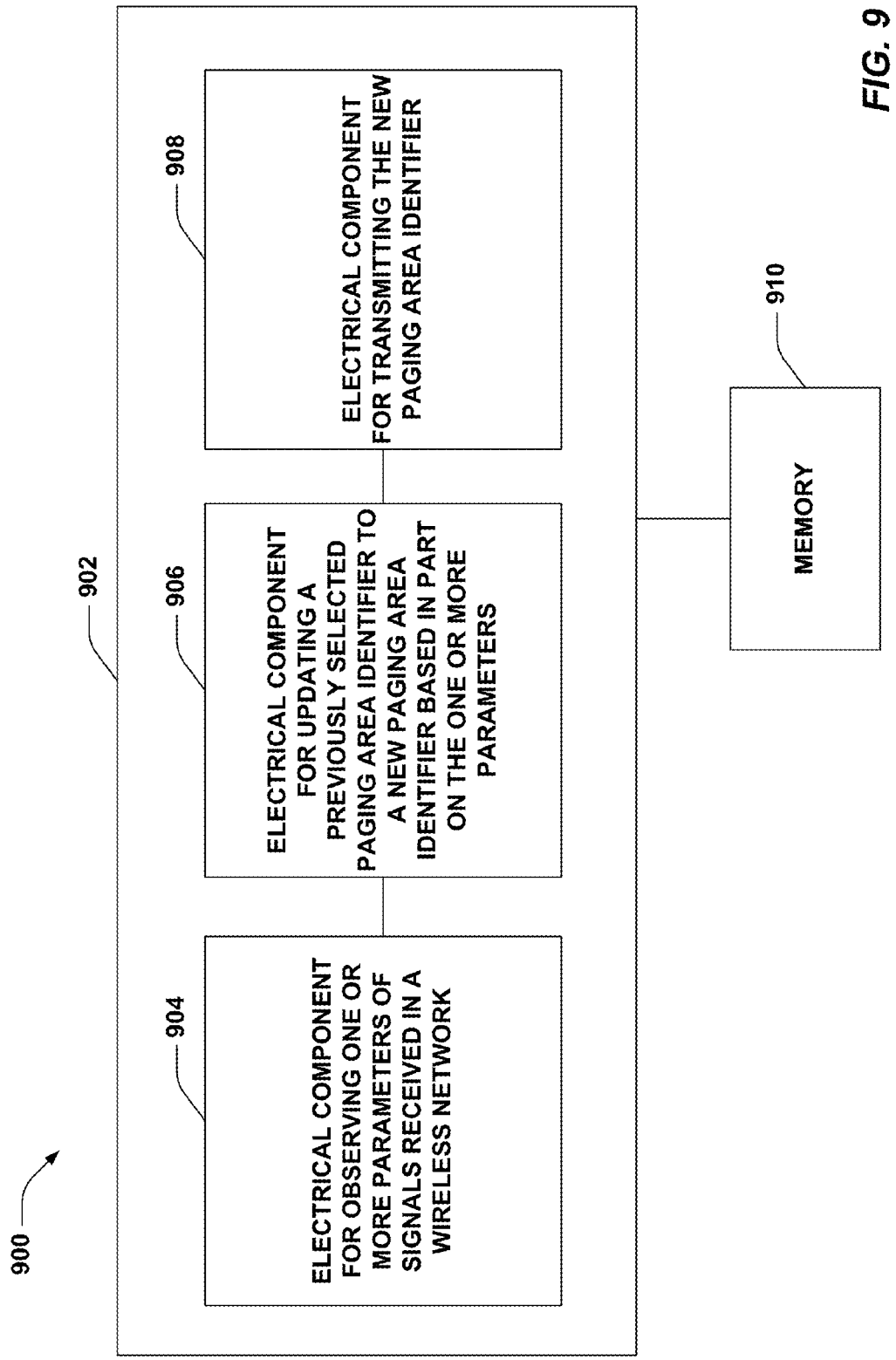
FIG. 9 is a block diagram of an example system that updates a paging area identifier.

With reference to FIG. 9, illustrated is a system 900 for updating a paging area identifier. For example, system 900 can reside at least partially within a low power base station. It is to be appreciated that system 900 is represented as including functional blocks, which can be functional blocks that represent functions implemented by a processor, software, or combination thereof (e.g., firmware). System 900 includes a logical grouping 902 of electrical components that can act in conjunction. For instance, logical grouping 902 can include an electrical component for observing one or more parameters of signals received in a wireless network 904. Further, logical grouping 902 can comprise an electrical component for updating a previously selected paging area identifier to a new paging area identifier based in part on the one or more parameters 906. Further, logical grouping 902 can include an electrical component for transmitting the new paging area identifier 908.

For example, electrical component 904 can include a reselection/registration determining component 214, paging load determining component 216, etc., as described above. In addition, for example, electrical component 906, in an aspect, can include an identifier updating component 212, as described above. Moreover, electrical component 908 can include a paging component 210, for example.

Additionally, system 900 can include a memory 910 that retains instructions for executing functions associated with the electrical components 904, 906, and 908. While shown as being external to memory 910, it is to be understood that one or more of the electrical components 904, 906, and 908 can exist within memory 910. In one example, electrical components 904, 906, and 908 can comprise at least one processor, or each electrical component 904, 906, and 908 can be a corresponding module of at least one processor. Moreover, in an additional or alternative example, electrical components 904, 906, and 908 can be a computer program product comprising a computer readable medium, where each electrical component 904, 906, and 908 can be corresponding code.

Figure 10:
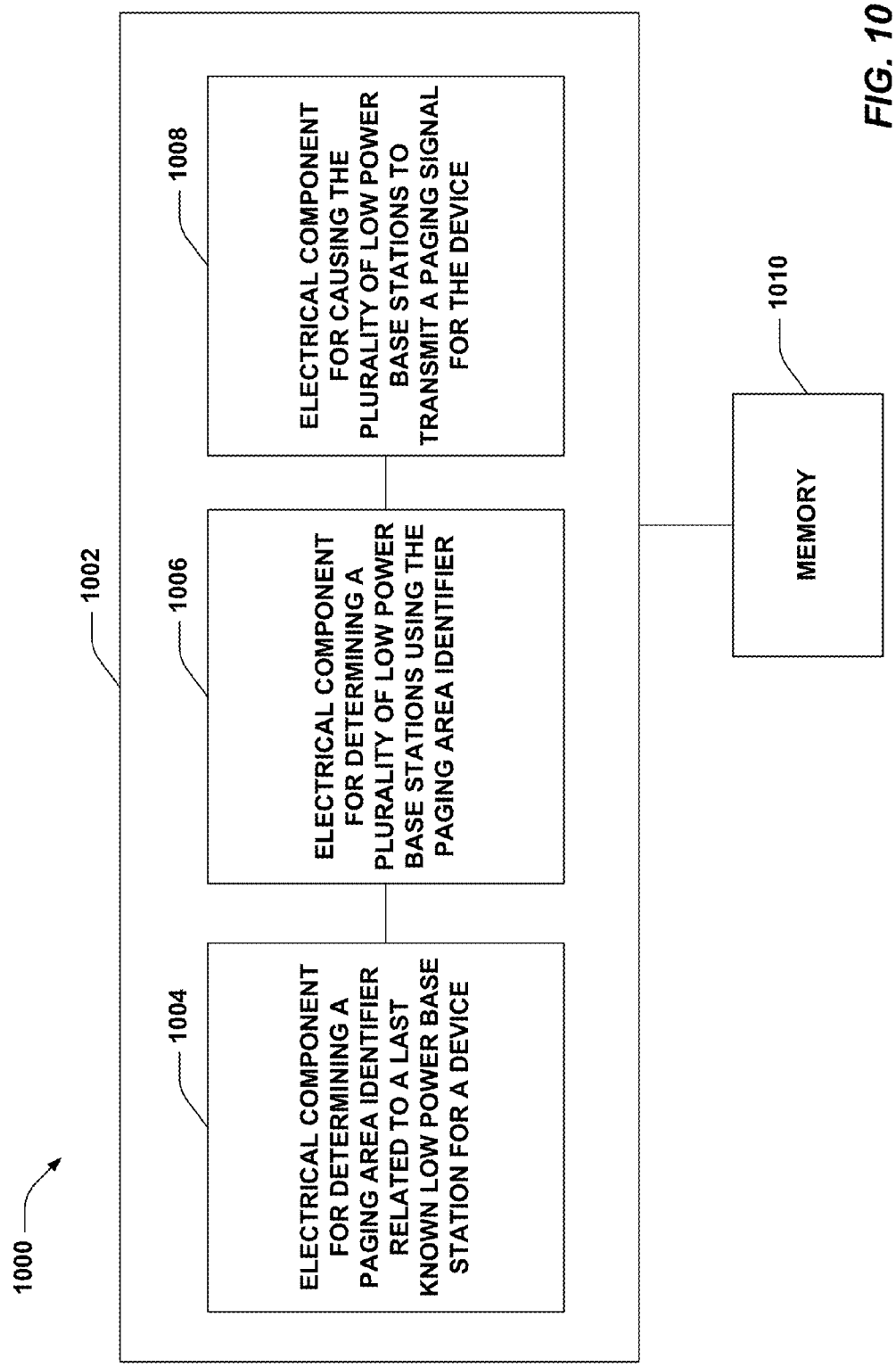
FIG. 10 is a block diagram of an example system that pages devices.

With reference to FIG. 10, illustrated is a system 1000 for paging devices in a wireless network. For example, system 1000 can reside at least partially within a low power base station gateway. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for determining a paging area identifier related to a last known low power base station for a device 1004. Further, logical grouping 1002 can comprise an electrical component for determining a plurality of low power base stations using the paging area identifier 1006. Further, logical grouping 1002 can include an electrical component for causing the plurality of low power base stations to transmit paging signals for the device 1008.

For example, electrical component 1004 can include a paging area determining component 312, as described above. In addition, for example, electrical component 1006, in an aspect, can include a paging area determining component 312, as described above. Moreover, electrical component 1008 can include a paging component 314, for example.

Additionally, system 1000 can include a memory 1010 that retains instructions for executing functions associated with the electrical components 1004, 1006, and 1008. While shown as being external to memory 1010, it is to be understood that one or more of the electrical components 1004, 1006, and 1008 can exist within memory 1010. In one example, electrical components 1004, 1006, and 1008 can comprise at least one processor, or each electrical component 1004, 1006, and 1008 can be a corresponding module of at least one processor. Moreover, in an additional or alternative example, electrical components 1004, 1006, and 1008 can be a computer program product comprising a computer readable medium, where each electrical component 1004, 1006, and 1008 can be corresponding code.

Figure 11:
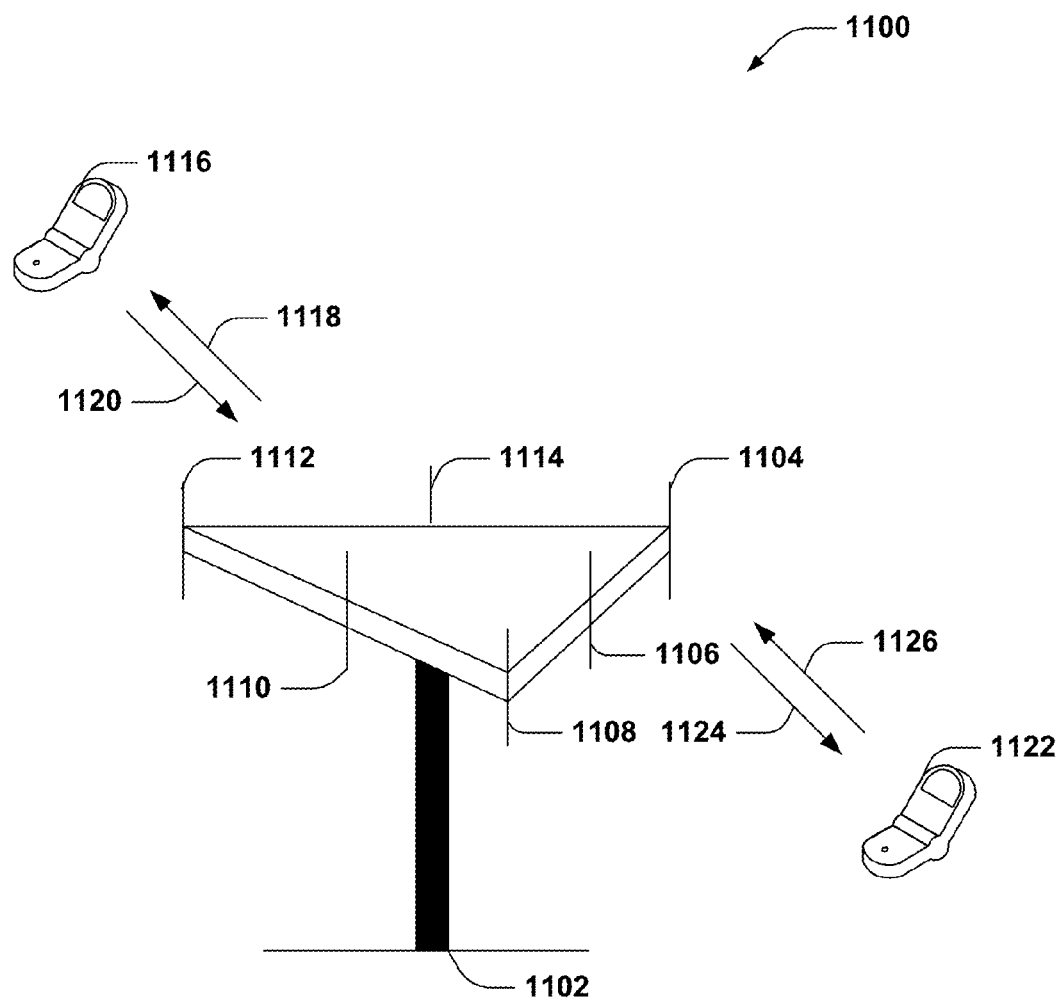
FIG. 11 is a block diagram of an example wireless communication system in accordance with various aspects set forth herein.

Referring now to FIG. 11, a wireless communication system 1100 is illustrated in accordance with various embodiments presented herein. System 1100 comprises a base station 1102 that can include multiple antenna groups. For example, one antenna group can include antennas 1104 and 1106, another group can comprise antennas 1108 and 1110, and an additional group can include antennas 1112 and 1114. Two antennas are illustrated for each antenna group; however, more or fewer antennas can be utilized for each group. Base station 1102 can additionally include a transmitter chain and a receiver chain, each of which can in turn comprise a plurality of components associated with signal transmission and reception (e.g., processors, modulators, multiplexers, demodulators, demultiplexers, antennas, etc.), as is appreciated.

Base station 1102 can communicate with one or more mobile devices such as mobile device 1116 and mobile device 1122; however, it is to be appreciated that base station 1102 can communicate with substantially any number of mobile devices similar to mobile devices 1116 and 1122. Mobile devices 1116 and 1122 can be, for example, cellular phones, smart phones, laptops, handheld communication devices, handheld computing devices, satellite radios, global positioning systems, PDAs, and/or any other suitable device for communicating over wireless communication system 1100. As depicted, mobile device 1116 is in communication with antennas 1112 and 1114, where antennas 1112 and 1114 transmit information to mobile device 1116 over a forward link 1118 and receive information from mobile device 1116 over a reverse link 1120. Moreover, mobile device 1122 is in communication with antennas 1104 and 1106, where antennas 1104 and 1106 transmit information to mobile device 1122 over a forward link 1124 and receive information from mobile device 1122 over a reverse link 1126. In a frequency division duplex (FDD) system, forward link 1118 can utilize a different frequency band than that used by reverse link 1120, and forward link 1124 can employ a different frequency band than that employed by reverse link 1126, for example. Further, in a time division duplex (TDD) system, forward link 1118 and reverse link 1120 can utilize a common frequency band and forward link 1124 and reverse link 1126 can utilize a common frequency band.

Each group of antennas and/or the area in which they are designated to communicate can be referred to as a sector of base station 1102. For example, antenna groups can be designed to communicate to mobile devices in a sector of the areas covered by base station 1102. In communication over forward links 1118 and 1124, the transmitting antennas of base station 1102 can utilize beamforming to improve signal-to-noise ratio of forward links 1118 and 1124 for mobile devices 1116 and 1122. Also, while base station 1102 utilizes beamforming to transmit to mobile devices 1116 and 1122 scattered randomly through an associated coverage, mobile devices in neighboring cells can be subject to less interference as compared to a base station transmitting through a single antenna to all its mobile devices. Moreover, mobile devices 1116 and 1122 can communicate directly with one another using a peer-to-peer or ad hoc technology as depicted. According to an example, system 1100 can be a multiple-input multiple-output (MIMO) communication system.

Figure 12:
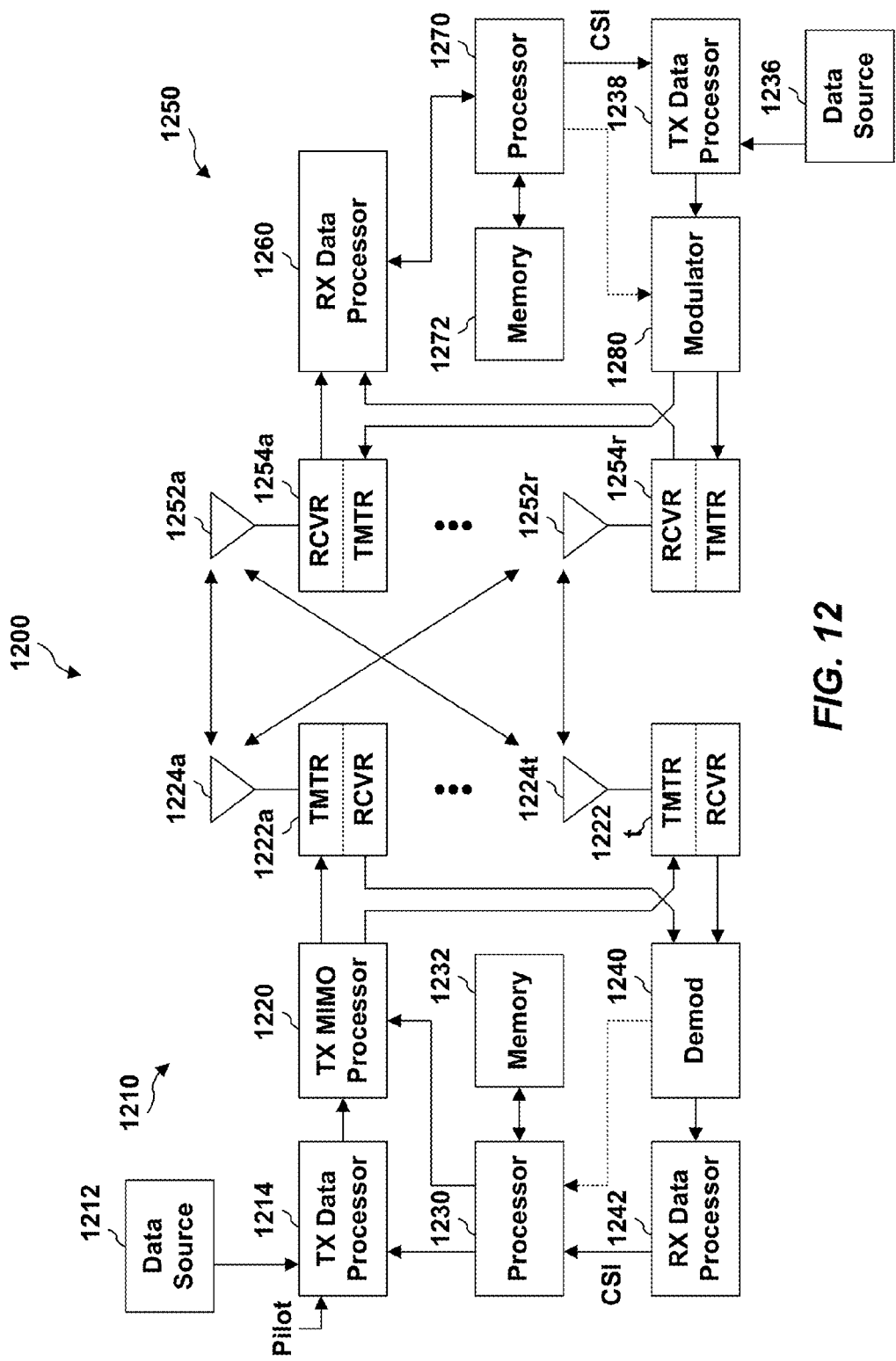
FIG. 12 is an illustration of an example wireless network environment that can be employed in conjunction with the various systems and methods described herein.

FIG. 12 shows an example wireless communication system 1200. The wireless communication system 1200 depicts one base station 1210, which can include a low power base station, and one mobile device 1250 for sake of brevity. However, it is to be appreciated that system 1200 can include more than one base station and/or more than one mobile device, wherein additional base stations and/or mobile devices can be substantially similar or different from example base station 1210 and mobile device 1250 described below. In addition, it is to be appreciated that base station 1210 and/or mobile device 1250 can employ the systems (FIGS. 1-3 and 8-11) and/or methods (FIGS. 4-7) described herein to facilitate wireless communication there between. For example, components or functions of the systems and/or methods described herein can be part of a memory 1232 and/or 1272 or processors 1230 and/or 1270 described below, and/or can be executed by processors 1230 and/or 1270 to perform the disclosed functions.

At base station 1210, traffic data for a number of data streams is provided from a data source 1212 to a transmit (TX) data processor 1214. According to an example, each data stream can be transmitted over a respective antenna. TX data processor 1214 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1250 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1230.

The modulation symbols for the data streams can be provided to a TX MIMO processor 1220, which can further process the modulation symbols (e.g., for OFDM). TX MIMO processor 1220 then provides $N_T$ modulation symbol streams to $N_T$ transmitters (TMTR) 1222a through 1222t. In various embodiments, TX MIMO processor 1220 applies beamforming weights to the symbols of the data streams and to the antenna from which the symbol is being transmitted.

Each transmitter 1222 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1222a through 1222t are transmitted from $N_T$ antennas 1224a through 1224t, respectively.

At mobile device 1250, the transmitted modulated signals are received by $N_R$ antennas 1252a through 1252r and the received signal from each antenna 1252 is provided to a respective receiver (RCVR) 1254a through 1254r. Each receiver 1254 conditions (e.g., filters, amplifies, and downconverts) a respective signal, digitizes the conditioned signal to provide samples, and further processes the samples to provide a corresponding "received" symbol stream.

An RX data processor 1260 can receive and process the $N_R$ received symbol streams from $N_R$ receivers 1254 based on a particular receiver processing technique to provide $N_T$ "detected" symbol streams. RX data processor 1260 can demodulate, deinterleave, and decode each detected symbol stream to recover the traffic data for the data stream. The processing by RX data processor 1260 is complementary to that performed by TX MIMO processor 1220 and TX data processor 1214 at base station 1210.

The reverse link message can comprise various types of information regarding the communication link and/or the received data stream. The reverse link message can be processed by a TX data processor 1238, which also receives traffic data for a number of data streams from a data source 1236, modulated by a modulator 1280, conditioned by transmitters 1254a through 1254r, and transmitted back to base station 1210.

At base station 1210, the modulated signals from mobile device 1250 are received by antennas 1224, conditioned by receivers 1222, demodulated by a demodulator 1240, and processed by a RX data processor 1242 to extract the reverse link message transmitted by mobile device 1250. Further, processor 1230 can process the extracted message to determine which precoding matrix to use for determining the beamforming weights.

Processors 1230 and 1270 can direct (e.g., control, coordinate, manage, etc.) operation at base station 1210 and mobile device 1250, respectively. Respective processors 1230 and 1270 can be associated with memory 1232 and 1272 that store program codes and data. Processors 1230 and 1270 can also perform functionalities described herein to support updating a paging area identifier for one or more low power base stations.

Figure 13:
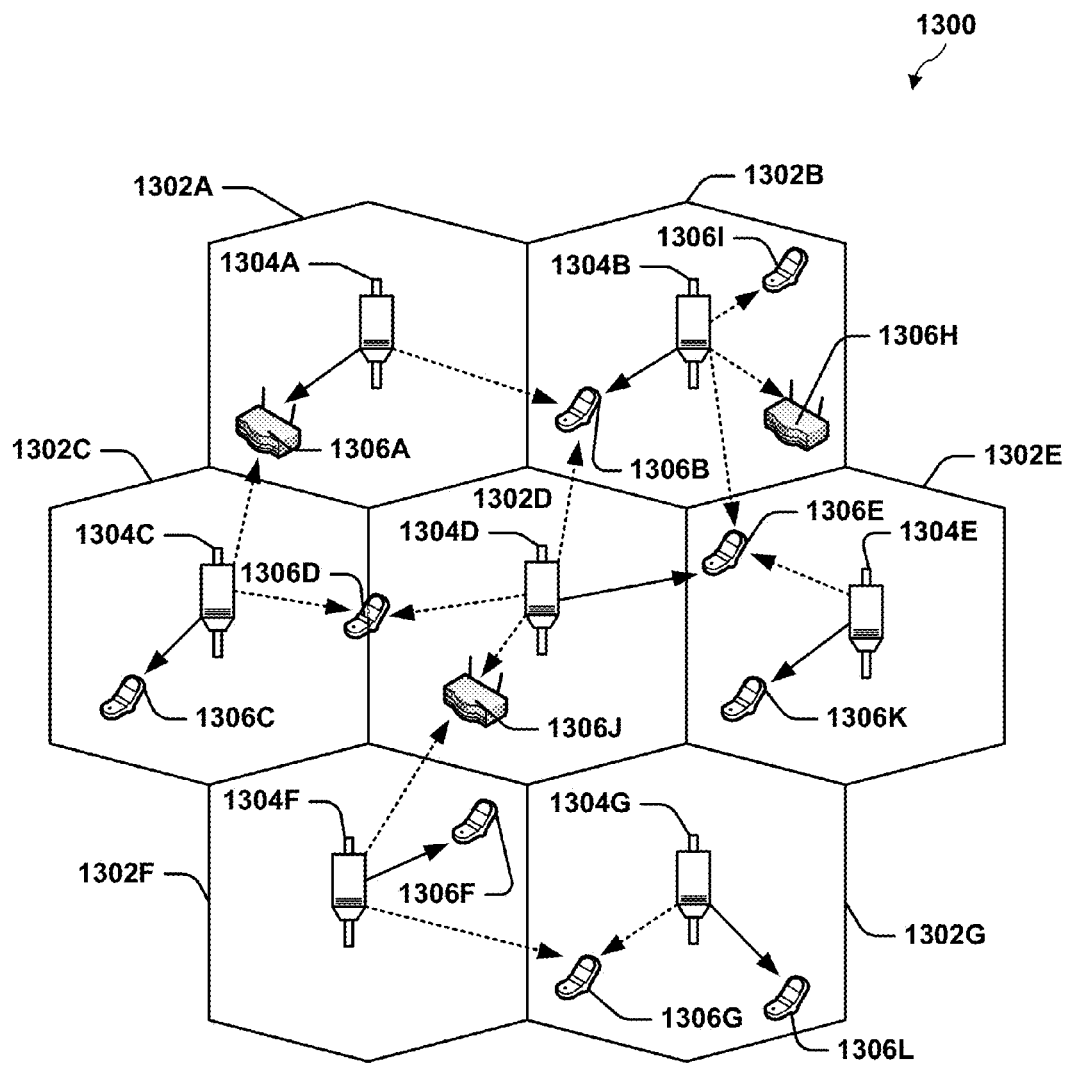
FIG. 13 illustrates an example wireless communication system, configured to support a number of devices, in which the aspects herein can be implemented.

FIG. 13 illustrates a wireless communication system 1300, configured to support a number of users, in which the teachings herein may be implemented. The system 1300 provides communication for multiple cells 1302, such as, for example, high power cells 1302A-1302G, with each cell being serviced by a corresponding access node 1304 (e.g., access nodes 1304A-1304G). As shown in FIG. 13, access terminals 1306 (e.g., access terminals 1306A-1306L) can be dispersed at various locations throughout the system over time. Each access terminal 1306 can communicate with one or more access nodes 1304 on a forward link (FL) and/or a reverse link (RL) at a given moment, depending upon whether the access terminal 1306 is active and whether it is in soft handoff, for example. The wireless communication system 1300 can provide service over a large geographic region.

Figure 14:
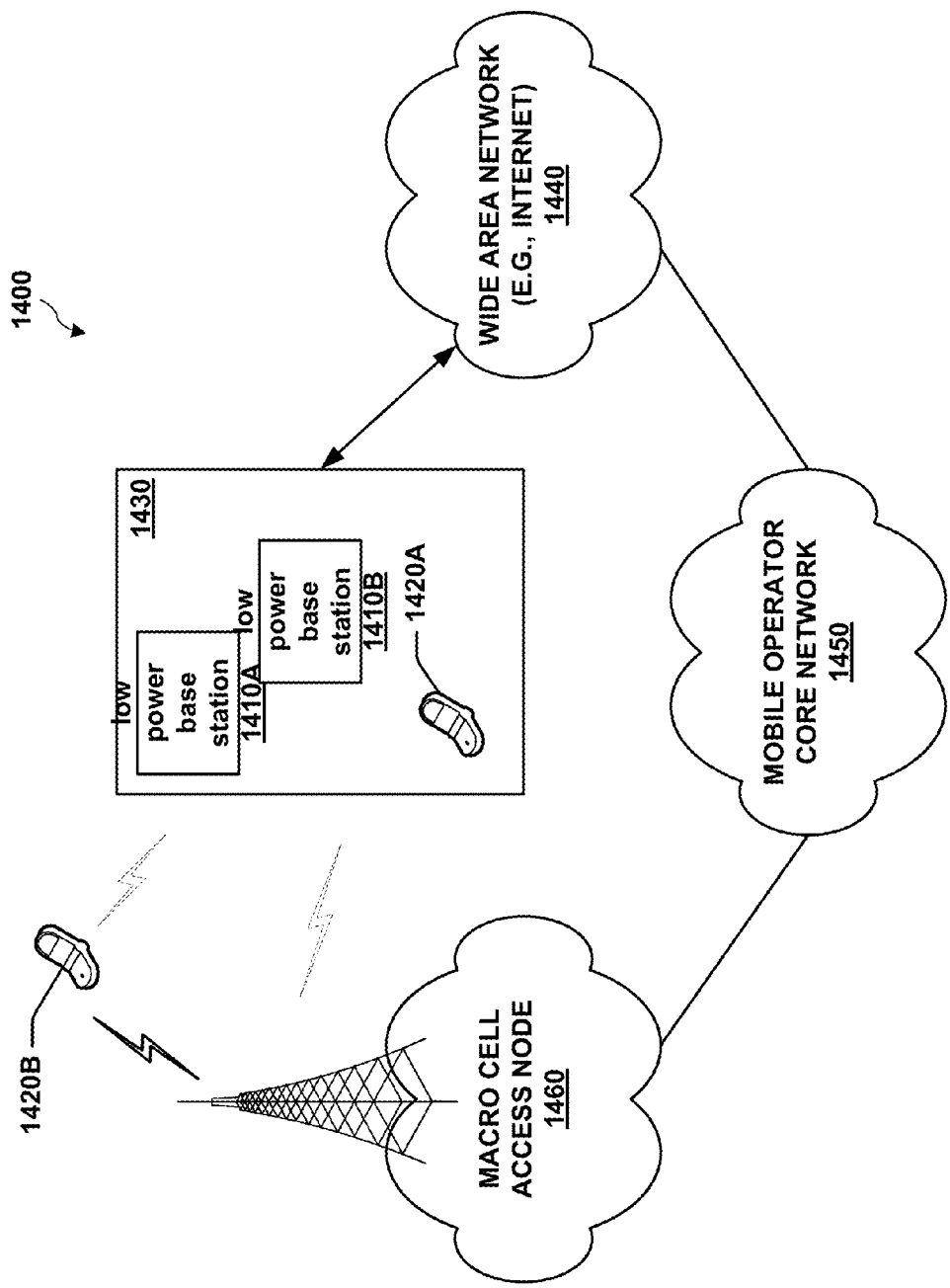
FIG. 14 is an illustration of an exemplary communication system to enable deployment of femtocells within a network environment.

FIG. 14 illustrates an exemplary communication system 1400 where one or more low power base stations are deployed within a network environment. Specifically, the system 1400 includes multiple low power base stations 1410A and 1410B (e.g., femtocell nodes or H(e)NB) installed in a relatively small scale network environment (e.g., in one or more user residences 1430). Each low power base station 1410 can be coupled to a wide area network 1440 (e.g., the Internet) and a mobile operator core network 1450 via a digital subscriber line (DSL) router, a cable modem, a wireless link, or other connectivity means (not shown). As will be discussed below, each low power base station 1410 can be configured to serve associated access terminals 1420 (e.g., access terminal 1420A) and, optionally, alien access terminals 1420 (e.g., access terminal 1420B). In other words, access to low power base stations 1410 can be restricted such that a given access terminal 1420 can be served by a set of designated (e.g., home) low power base station(s) 1410 but may not be served by any non-designated low power base stations 1410 (e.g., a neighbor's low power base station).

Figure 15:
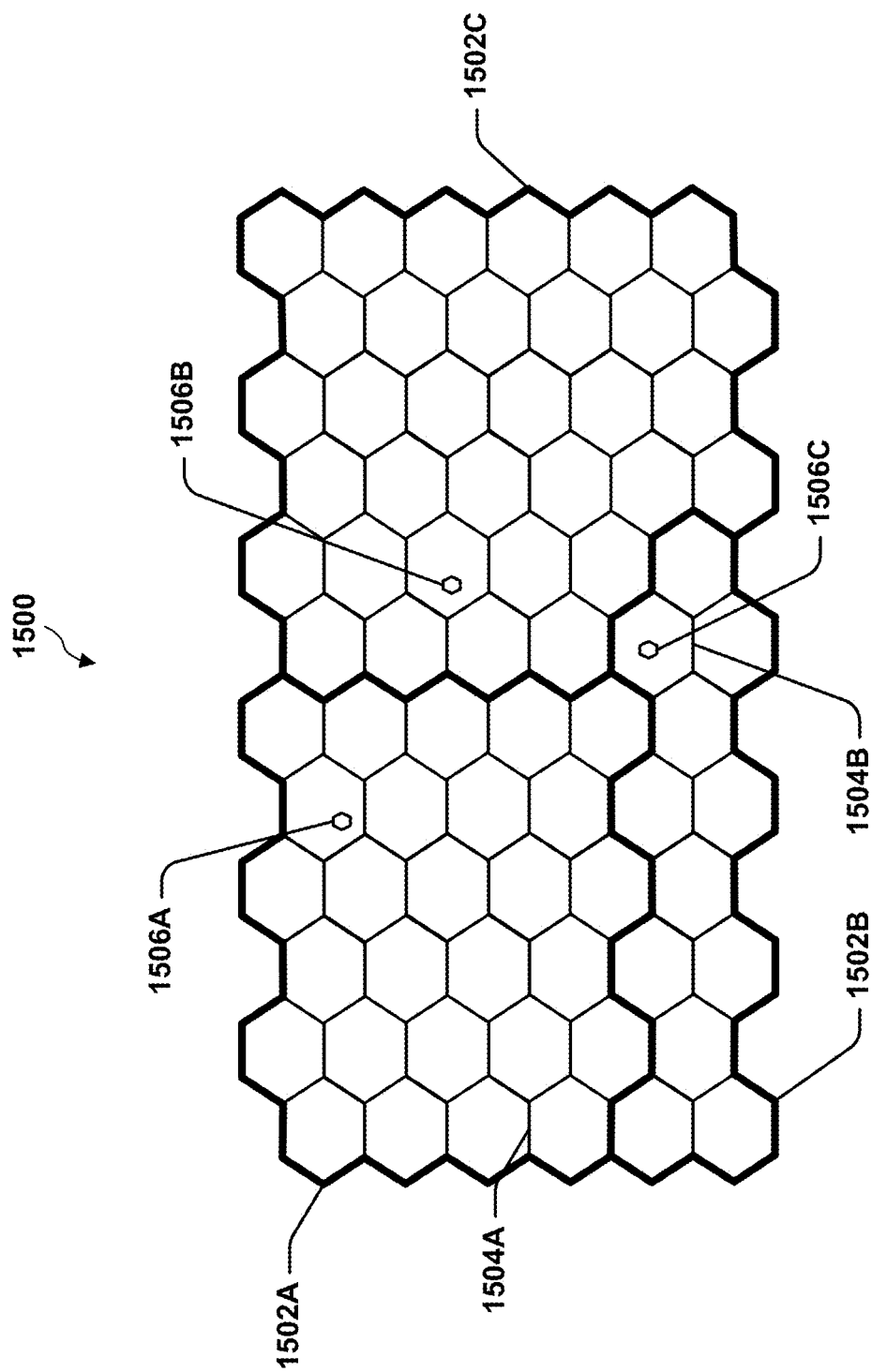
FIG. 15 illustrates an example of a coverage map having several defined tracking areas.

FIG. 15 illustrates an example of a coverage map 1500 where several tracking areas 1502 (or routing areas or location areas) are defined, each of which includes several high power base station coverage areas 1504. Here, areas of coverage associated with tracking areas 1502A, 1502B, and 1502C are delineated by the wide lines and the high power base station coverage areas 1504 are represented by the hexagons. The tracking areas 1502 also include femto coverage areas 1506. In this example, each of the femto coverage areas 1506 (e.g., femto coverage area 1506C) is depicted within a high power base station coverage area 1504 (e.g., high power base station coverage area 1504B). It should be appreciated, however, that a femto coverage area 1506 may not lie entirely within a high power base station coverage area 1504. In practice, a large number of femto coverage areas 1506 can be defined with a given tracking area 1502 or high power base station coverage area 1504. Also, one or more pico coverage areas (not shown) can be defined within a given tracking area 1502 or high power base station coverage area 1504.

Referring again to FIG. 14, the owner of a low power base station 1410 can subscribe to mobile service, such as, for example, 3G mobile service, offered through the mobile operator core network 1450. In another example, the low power base station 1410 can be operated by the mobile operator core network 1450 to expand coverage of the wireless network. In addition, an access terminal 1420 can be capable of operating both in high power base station environments and in smaller scale (e.g., residential or low power base station) network environments. Thus, for example, depending on the current location of the access terminal 1420, the access terminal 1420 can be served by a high power cell access node 1460 or by any one of a set of low power base stations 1410 (e.g., the low power base stations 1410A and 1410B that reside within a corresponding user residence 1430). For example, when a subscriber is outside his home, he is served by a standard high power cell access node (e.g., node 1460) and when the subscriber is at home, he is served by a low power base station (e.g., node 1410A). Here, it should be appreciated that a low power base station 1410 can be backward compatible with existing access terminals 1420.

A low power base station 1410 can be deployed on a single frequency or, in the alternative, on multiple frequencies. Depending on the particular configuration, the single frequency or one or more of the multiple frequencies can overlap with one or more frequencies used by a high power cell access node (e.g., node 1460). In some aspects, an access terminal 1420 can be configured to connect to a preferred low power base station (e.g., the home low power base station of the access terminal 1420) whenever such connectivity is possible. For example, whenever the access terminal 1420 is within the user's residence 1430, it can communicate with the home low power base station 1410.

In some aspects, if the access terminal 1420 operates within the mobile operator core network 1450 but is not residing on its most preferred network (e.g., as defined in a preferred roaming list), the access terminal 1420 can continue to search for the most preferred network (e.g., low power base station 1410) using a Better System Reselection (BSR), which can involve a periodic scanning of available systems to determine whether better systems are currently available, and subsequent efforts to associate with such preferred systems. Using an acquisition table entry (e.g., in a preferred roaming list), in one example, the access terminal 1420 can limit the search for specific band and channel. For example, the search for the most preferred system can be repeated periodically. Upon discovery of a preferred low power base station, such as low power base station 1410, the access terminal 1420 selects the low power base station 1410 for camping within its coverage area.

A low power base station can be restricted in some aspects. For example, a given low power base station can only provide certain services to certain access terminals. In deployments with so-called restricted (or closed) association, a given access terminal can only be served by the high power cell mobile network and a defined set of low power base stations (e.g., the low power base stations 1410 that reside within the corresponding user residence 1430). In some implementations, a low power base station can be restricted to not provide, for at least one access terminal, at least one of: signaling, data access, registration, paging, or service.

In some aspects, a restricted low power base station (which can also be referred to as a Closed Subscriber Group H(e)NB) is one that provides service to a restricted provisioned set of access terminals. This set can be temporarily or permanently extended as necessary. In some aspects, a Closed Subscriber Group (CSG) can be defined as the set of access nodes (e.g., low power base stations) that share a common access control list of access terminals. A channel on which all low power base stations (or all restricted low power base stations) in a region operate can be referred to as a femto channel.

Various relationships can thus exist between a given low power base station and a given access terminal. For example, from the perspective of an access terminal, an open low power base station can refer to a low power base station with no restricted association. A restricted low power base station can refer to a low power base station that is restricted in some manner (e.g., restricted for association and/or registration). A home low power base station can refer to a low power base station on which the access terminal is authorized to access and operate on. A guest low power base station can refer to a low power base station on which an access terminal is temporarily authorized to access or operate on. An alien low power base station can refer to a low power base station on which the access terminal is not authorized to access or operate on, except for perhaps emergency situations (e.g., 911 calls).

From a restricted low power base station perspective, a home access terminal can refer to an access terminal that authorized to access the restricted low power base station. A guest access terminal can refer to an access terminal with temporary access to the restricted low power base station. An alien access terminal can refer to an access terminal that does not have permission to access the restricted low power base station, except for perhaps emergency situations, for example, 911 calls (e.g., an access terminal that does not have the credentials or permission to register with the restricted low power base station).

For convenience, the disclosure herein describes various functionality in the context of a low power base station. It should be appreciated, however, that a pico node can provide the same or similar functionality as a low power base station, but for a larger coverage area. For example, a pico node can be restricted, a home pico node can be defined for a given access terminal, and so on.

A wireless multiple-access communication system can simultaneously support communication for multiple wireless access terminals. As mentioned above, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out system, a MIMO system, or some other type of system.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for selecting a paging area identifier at a low power base station, comprising:
    determining whether a neighboring high power base station or a neighboring low power base station is detected, wherein determining whether the neighboring high power base station or the neighboring low power base station is detected comprises observing one or more parameters of a detected neighboring base station and determining whether the detected neighboring base station comprises the neighboring high power base station or the neighboring low power base station based at least on one of the one or more parameters, wherein the neighboring high power base station provides a larger radio coverage than the neighboring low power base station;
    wherein if the neighboring high power base station is detected:
        observing a broadcasted paging area identifier of the neighboring high power base station;
        selecting the broadcasted paging area identifier of the neighboring low power base station for broadcasting; and
        transmitting the paging area identifier;
    wherein if the neighboring low power base station is detected and the neighboring low power base station is in the same cell as the low power base station:
        observing a broadcasted paging area identifier of the neighboring low power base station;
        selecting the broadcasted paging area identifier of the neighboring low power base station for broadcasting; and
        transmitting the paging area identifier; and
    wherein if the neighboring low power base station is detected and the neighboring low power base station is not in the same cell as the low power base station:
        observing a broadcasted paging area identifier of the neighboring low power base station;
        selecting a broadcasted paging area identifier that is different from the broadcasting paging area identifier of the neighboring low power base station for broadcasting; and
        transmitting the paging area identifier.

2. The method of claim 1, wherein the paging area identifier comprises one or more of a location area code, a tracking area code, a routing area code, and a color code.

3. The method of claim 1, further comprising observing one or more reselection parameters and a closed subscriber group identifier from the neighboring high power base station.

4. The method of claim 1, further comprising selecting the neighboring high power base station for the observing based at least in part on measuring one or more radio frequency parameters from the neighboring high power base station.

5. The method of claim 1, further comprising selecting the neighboring high power base station for the observing based at least in part on a network operator policy.

6. The method of claim 1, wherein determining whether the neighboring high power base station is detected further comprises:
    observing the one or more parameters of the detected neighboring base station, wherein the one or more parameters comprise at least one of a primary scrambling code (PSC) range, a PSC closed subscriber group (CSG) identifier split information, a presence of a CSG identifier, and a broadcasted transmit power level.

7. The method of claim 1, further comprising, where the neighboring low power base station is not detected:
    obtaining a random paging area identifier; and
    selecting the paging area identifier of the low power base station to be the random paging area identifier.

8. The method of claim 1, further comprising:
    obtaining one or more coverage area parameters of the neighboring high power base station related to a neighboring high power base station coverage area;
    determining to select the paging area identifier based on the one or more coverage area parameters rather than the broadcasted paging area identifier; and
    selecting the paging area identifier of the neighboring low power base station based on the one or more coverage area parameters such that a low power base station coverage area is less than the neighboring high power base station coverage area.

9. The method of claim 8, wherein the one or more coverage area parameters comprise at least one of a cell identifier and a primary scrambling code of the neighboring high power base station.

10. The method of claim 1, wherein the one or more coverage area parameters comprise at least a cell identifier.

11. An apparatus for selecting a paging area identifier at a low power base station, comprising:
    at least one processor configured to:
        determine whether a neighboring high power base station or a neighboring low power base station is detected, wherein determining whether the neighboring high power base station or the neighboring low power base station is detected comprises observing one or more parameters of a detected neighboring base station and determining whether the detected neighboring base station comprises the neighboring high power base station or the neighboring low power base station based at least on one of the one or more parameters, wherein the neighboring high power base station provides a larger radio coverage than the neighboring low power base station;
    wherein if the neighboring high power base station is detected:
        observe a broadcasted paging area identifier of the neighboring high power base station;
        select the broadcasted paging area identifier of the neighboring low power base station for broadcasting; and
        transmit the paging area identifier;
    wherein if the neighboring low power base station is detected and the neighboring low power base station is in the same cell as the low power base station:
        observe a broadcasted paging area identifier of the neighboring low power base station;
        select the broadcasted paging area identifier of the neighboring low power base station for broadcasting; and
        transmit the paging area identifier; and wherein if the neighboring low power base station is detected and the neighboring low power base station is not in the same cell as the low power base station:
    observe a broadcasted paging area identifier of the neighboring low power base station;
    select a broadcasted paging area identifier that is different from the broadcasting paging area identifier of the neighboring low power base station for broadcasting; and
    transmit the paging area identifier.

12. The apparatus of claim 11, wherein the paging area identifier comprises one or more of a location area code, a tracking area code, a routing area code, and a color code.

13. The apparatus of claim 11, wherein the at least one processor is further configured to observe one or more reselection parameters and a closed subscriber group identifier from the neighboring high power base station.

14. The apparatus of claim 11, wherein the at least one processor is further configured to select the neighboring high power base station to observe based at least in part on one or more measured radio frequency parameters from the neighboring high power base station.

15. The apparatus of claim 11, wherein the at least one processor is further configured to select the neighboring high power base station to observe based at least in part on a network operator policy.

16. The apparatus of claim 11, wherein the at least one processor is further configured to determine whether the neighboring high power base station is detected by:
    observing the one or more parameters of the detected neighboring base station, wherein the one or more parameters comprise at least one of a primary scrambling code (PSC) range, a PSC closed subscriber group (CSG) identifier split information, a presence of a CSG identifier, and a broadcasted transmit power level.

17. The apparatus of claim 11, wherein the at least one processor is further configured to, where the neighboring low power base station is not detected:
    obtain a random paging area identifier; and
    select the paging area identifier to be the random paging area identifier.

18. The apparatus of claim 11, wherein the at least one processor is further configured to:
    obtain one or more coverage area parameters of the neighboring high power base station related to a neighboring high power base station coverage area;
    determine to select the paging area identifier based on the one or more coverage area parameters rather than the broadcasted paging area identifier; and
    select the paging area identifier of the neighboring low power base station based on the one or more coverage area parameters such that a low power base station coverage area is less than the neighboring high power base station coverage area.

19. The apparatus of claim 18, wherein the one or more coverage area parameters comprise at least one of a cell identifier and a primary scrambling code of the neighboring high power base station.

20. An apparatus for selecting a paging area identifier at a low power base station, comprising:
    means for determining whether a neighboring high power base station or a neighboring low power base station is detected, wherein the means for determining whether the neighboring high power base station or the neighboring low power base station is detected comprises means for observing one or more parameters of a detected neighboring base station and determining whether the detected neighboring base station comprises the neighboring high power base station or the neighboring low power base station based at least on one of the one or more parameters, wherein the neighboring high power base station provides a larger radio coverage than the neighboring low power base station;
    means for observing a broadcasted paging area identifier of the neighboring high power base station when the neighboring high power base station is detected;
    means for selecting the paging area identifier of the neighboring low power base station for broadcasting when the neighboring high power base station is detected;
    means for transmitting the paging area identifier when the neighboring high power base station is detected;
    wherein the means for observing is further for observing a broadcasted paging area identifier of the neighboring low power base station when the neighboring low power base station is detected and the neighboring low power base station is in the same cell as the low power base station;
    wherein the means for selecting is further for selecting the broadcasted paging area identifier of the neighboring low power base station for broadcasting when the neighboring low power base station is detected and the neighboring low power base station is in the same cell as the low power base station;
    wherein the means for transmitting is further for transmitting the paging area identifier when the neighboring low power base station is detected and the neighboring low power base station is in the same cell as the low power base station;
    wherein the means for observing is further for observing a broadcasted paging area identifier of the neighboring low power base station when the neighboring low power base station is detected and the neighboring low power base station is not in the same cell as the low power base station;
    wherein the means for selecting is further for selecting the broadcasted paging area identifier that is different from the broadcasting paging area identifier of the neighboring low power base station for broadcasting when the neighboring low power base station is detected and the neighboring low power base station is not in the same cell as the low power base station; and
    wherein the means for transmitting is further for transmitting the paging area identifier when the neighboring low power base station is detected and the neighboring low power base station is not in the same cell as the low power base station.

21. The apparatus of claim 20, wherein the paging area identifier comprises one or more of a location area code, a tracking area code, a routing area code, and a color code.

22. The apparatus of claim 20, further comprising means for observing one or more reselection parameters and a closed subscriber group identifier from the neighboring high power base station.

23. The apparatus of claim 20, further comprising means for selecting the neighboring high power base station to observe based at least in part on one or more measured radio frequency parameters from the neighboring high power base station.

24. The apparatus of claim 20, further comprising means for selecting the neighboring high power base station to observe based at least in part on a network operator policy.

25. The apparatus of claim 20, wherein the means for determining whether the neighboring high power base station is detected further comprises:

means for observing the one or more parameters of the detected neighboring base station, wherein the one or more parameters comprise at least one of a primary scrambling code (PSC) range, a PSC closed subscriber group (CSG) identifier split information, a presence of a CSG identifier, and a broadcasted transmit power level.

26. The apparatus of claim 20, further comprising:
means for obtaining a random paging area identifier when the neighboring low power base station is not detected; and
means for selecting the random paging area identifier to be the random paging area identifier when the neighboring low power base station is not detected.

27. The apparatus of claim 20, further comprising:
means for obtaining one or more coverage area parameters of the neighboring high power base station related to a neighboring high power base station coverage area;
means for determining to select the paging area identifier based on the one or more coverage area parameters rather than the broadcasted paging area identifier; and
means for selecting a paging area identifier of the neighboring low power base station based on the one or more coverage area parameters such that a coverage area is less than the neighboring high power base station coverage area.

28. The apparatus of claim 27, wherein the one or more coverage area parameters comprise at least one of a cell identifier and a primary scrambling code of the neighboring high power base station.

29. A non-transitory computer-readable medium storing computer executable code for selecting a paging area identifier at a low power base station, comprising code for:
determining whether a neighboring high power base station or a neighboring low power base station is detected, wherein the code for determining whether the neighboring high power base station or the neighboring low power base station is detected comprises code for observing one or more parameters of a detected neighboring base station and determining whether the detected neighboring base station comprises the neighboring high power base station or the neighboring low power base station based at least on one of the one or more parameters, wherein the neighboring high power base station provides a larger radio coverage than the neighboring low power base station;
wherein if the neighboring high power base station is detected:
observing a broadcasted paging area identifier of the neighboring high power base station;
selecting the broadcasted paging area identifier of the neighboring low power base station for broadcasting; and
transmitting the paging area identifier;
wherein if the neighboring low power base station is detected and the neighboring low power base station is in the same cell as the low power base station:
observing a broadcasted paging area identifier of the neighboring low power base station;
selecting the broadcasted paging area identifier of the neighboring low power base station for broadcasting; and
transmitting the paging area identifier; and
wherein if the neighboring low power base station is detected and the neighboring low power base station is not in the same cell as the low power base station:
observing a broadcasted paging area identifier of the neighboring low power base station;
selecting a broadcasted paging area identifier that is different from the broadcasting paging area identifier of the neighboring low power base station for broadcasting; and
transmitting the paging area identifier.

30. The computer-readable medium of claim 29, wherein the paging area identifier comprises one or more of a location area code, a tracking area code, a routing area code, and a color code.

31. The computer-readable medium of claim 29, further comprising code for observing one or more reselection parameters and a closed subscriber group identifier from the neighboring high power base station.

32. The computer-readable medium of claim 29, further comprising code for selecting the neighboring high power base station to observe based at least in part on one or more measured radio frequency parameters from the neighboring high power base station.

33. The computer-readable medium of claim 29, further comprising code for selecting the neighboring high power base station to observe based at least in part on a network operator policy.

34. The computer-readable medium of claim 29, wherein the code for determining whether the neighboring high power base station is detected further comprises code for:
observing the one or more parameters of the detected neighboring base station, wherein the one or more parameters comprise at least one of a primary scrambling code (PSC) range, a PSC closed subscriber group (CSG) identifier split information, a presence of a CSG identifier, and a broadcasted transmit power level.

35. The computer-readable medium of claim 29, further comprising code for, where the neighboring low power base station is not detected:
obtaining a random paging area identifier; and
selecting the paging area identifier to be the random paging area identifier.

36. The computer-readable medium of claim 29, further comprising code for:
obtaining one or more coverage area parameters of the neighboring high power base station related to a neighboring high power base station coverage area
determining to select the paging area identifier based on the one or more coverage area parameters rather than the broadcasted paging area identifier; and
selecting paging area identifier of the neighboring low power base station based on the one or more coverage area parameters such that a coverage area is less than the neighboring high power base station coverage area.

37. The computer-readable medium of claim 36, wherein the one or more coverage area parameters comprise at least one of a cell identifier and a primary scrambling code of the neighboring high power base station.

38. A method for selecting a paging area identifier at a low power base station, comprising:
determining whether a neighboring high power base station is detected;
obtaining one or more coverage area parameters of the neighboring high power base station related to a neighboring high power base station coverage area, wherein the one or more coverage area parameters comprise at least one of a cell identifier and a primary scrambling code of the neighboring high power base station;
selecting the paging area identifier of the low power base station based on the one or more coverage area parameters, wherein a low power base station coverage area is less than the neighboring high power base station coverage area, and wherein the paging area identifier of the low power base station is different from a paging area identifier of a neighboring low power base station if the neighboring low power base station is not in the same cell as the low power base station; and transmitting the selected paging area identifier.

39. The method of claim 38, further comprising:

observing, where the neighboring high power base station is detected, a broadcasted paging area identifier of the neighboring high power base station; and determining to select the paging area identifier based on the one or more coverage area parameters rather than the broadcasted paging area identifier.

\* \* \* \* \*